US010147122B2

(12) United States Patent
Hurley et al.

(10) Patent No.: US 10,147,122 B2
(45) Date of Patent: Dec. 4, 2018

(54) PRIORITIZING TOPICS OF INTEREST DETERMINED FROM PRODUCT EVALUATIONS

(71) Applicant: Google LLC, Mountian View, CA (US)

(72) Inventors: Fergus Hurley, London (GB); Hanna Mazzawi, San Jose, CA (US); Olivier Gaillard, London (GB)

(73) Assignee: Google LLC, Mountain View, CA (US)

( * ) Notice: Subject to any disclaimer, the term of this patent is extended or adjusted under 35 U.S.C. 154(b) by 281 days.

(21) Appl. No.: 15/281,807

(22) Filed: Sep. 30, 2016

(65) Prior Publication Data

US 2017/0337594 A1 Nov. 23, 2017

Related U.S. Application Data

(60) Provisional application No. 62/337,982, filed on May 18, 2016.

(51) Int. Cl.
*G06F 7/00* (2006.01)
*G06F 17/30* (2006.01)
(Continued)

(52) U.S. Cl.
CPC ....... *G06Q 30/0282* (2013.01); *G06F 17/271* (2013.01); *G06F 17/274* (2013.01);
(Continued)

(58) Field of Classification Search
CPC . G06F 17/271; G06F 17/274; G06Q 30/0282; G06Q 30/02
(Continued)

(56) References Cited

U.S. PATENT DOCUMENTS 8,892,549 B1 11/2014 Thakur
2005/0065909 A1* 3/2005 Musgrove .............. G06Q 30/02
(Continued)

FOREIGN PATENT DOCUMENTS

WO WO-2009155375 A2 12/2009

OTHER PUBLICATIONS

Second Written Opinion of International Application No. PCT/US2016/068671, dated Apr. 26, 2018, 8 pp.
(Continued)

*Primary Examiner* — Md I Uddin
(74) *Attorney, Agent, or Firm* — Shumaker & Sieffert, P.A.

(57) ABSTRACT

A measurement of an effect of a topic on an aggregate of numerical information related to a set of evaluations of a specific product can be produced. A subset of the set of the evaluations can be determined. The subset can be defined by inclusion of textual information about the topic. The specific product can be a good, a service, an application, the like, or any combination thereof. An aggregate of the numerical information related to the subset can be determined. Based on the aggregate of the numerical information related to the subset, the measurement of the effect of the topic on the aggregate of the numerical information related to the set can be calculated. The measurement can be included in a file to be transmitted to a computer system to be used to control operations performed by the computer system to produce a modification to the specific product.

16 Claims, 19 Drawing Sheets

(51) Int. Cl.
*G06Q 30/02* (2012.01)
*G06Q 10/06* (2012.01)
*G06Q 10/10* (2012.01)
*G06F 17/27* (2006.01)

(52) U.S. Cl.
CPC ............. *G06Q 10/06* (2013.01); *G06Q 10/10* (2013.01); *G06Q 30/02* (2013.01)

(58) Field of Classification Search
USPC ........................................ 707/705, 707, 708
See application file for complete search history.

(56) References Cited

U.S. PATENT DOCUMENTS

| | | |
|---|---|---|
| 2007/0220479 A1 | 9/2007 | Huges |
| 2011/0173191 A1 | 7/2011 | Tsaparas et al. |
| 2013/0080212 A1 | 3/2013 | Li et al. |
| 2016/0232546 A1* | 8/2016 | Ranft .................. G06Q 30/0206 |
| 2017/0068964 A1 | 3/2017 | Gevka et al. |
| 2017/0270572 A1 | 9/2017 | Schydlowsky |
| 2018/0027002 A1 | 1/2018 | Rodeck et al. |

OTHER PUBLICATIONS

Response to Second Written Opinion dated Apr. 26, 2018, from International Application No. PCT/US2016/068671, filed Jun. 27, 2018, 13 pp.
"Angie's List—Wikipedia, the free encyclopedia," at https://en.wikipedia.org/wiki/Angie%27s_List, last visited Apr. 18, 2016.
"Consumer Reports—Wikipedia, the free encyclopedia," at https://en.wikipedia.org/wiki/Consumer_Reports, last visited Jan. 31, 2018.
"Systems Sciences," at http://systems-sciences.uni-graz.at/etextbook/bigdata/sentiment_analysis.html, last visited May 14, 2016.
"Yelp—Wikipedia, the free encyclopedia," at https://en.wikipedia.org/wiki/Yelp, last visited Apr. 18, 2016.
International Search Report and Written Opinion dated Mar. 9, 2017 as received in Application No. PCT/US2016/068671.
Office Action dated Jun. 22, 2017 as received in GB Application No. 1621990.9.
Examination Report under Section 18(3) dated Jul. 18, 2018, from International Application No. GB1621990.9, 7 pp.
International Preliminary Report on Patentability dated Aug. 9, 2018, from International Application No. PCT/US2016/068671, 9 pp.

* cited by examiner

FIG. 2

High-Heeled Horseshoes

| | | |
|---|---|---|
| A | 5 | I almost fell out of my chair laughing when I put the stilettos on the Clydesdales! My kids found the game very easy to play, which they did for hours on the tablet without draining the battery. |
| B | 5 | Very stable for a free game. The impressive graphics do not have the effect of slowing other applications. Intuitive interface. Oh, and did I mention that it's tons of fun? |
| C | 4 | This is a cute game and pretty easy to play. It seems reasonably free of bugs and I was able play it on my tablet for the whole flight without draining the battery. |
| D | 5 | Manolo Blahniks are not wasted on Appaloosas! The surprisingly simple interface makes it easy to put shoes on these magnificent animals. I did not see any problems with the operations of the app. |
| E | 5 | All Shetland ponies should wear platform shoes! Surprisingly fun game. Easy to play, easy on the battery, no hang ups. You will have it as much as your kids. |

202 (a) — 216, 218, 220, 222, 224

Karate Cows

| | | |
|---|---|---|
| A | 5 | I love this game! It's so cute to watch cartoon cows break boards! My kids love it, too, and it is easy for them to play. |
| B | 3 | The levels are well designed. The game can be difficult to play at the higher levels if you are not using a console. Possibly a bug. The higher levels also consumes a high amount of resources. |
| C | 2 | This game is juvenile and the graphics stink! It uses up way too much memory for as simple as it is to play. |
| E | 3 | Fun way to pass the time, but some of the higher levels may be too difficult for small children to play. Sometimes hangs up at the higher levels. |

204 (b) — 226, 228, 230, 232

Pig Parlor

| | | |
|---|---|---|
| A | 2 | Giving the pig a mud bath at the first level was easy to use, but I was not able to put the lipstick on the pig at crazy level 3 when the application stalled. |
| C | 1 | They should call this game Resource Hog. And the third level crashed hard. |
| D | 2 | Amazing graphics for a children's game, but they bog down other running applications. Additionally, the third level is difficult to play where the player tries to put the lipstick on the pig. |
| E | 4 | The second level is fun. The look on the pig's face when you use the curling iron to curl its tail is priceless! Wonderful picture quality and a great interface. |

206 (c) — 234, 236, 238, 240

Chinese Chess

| | | |
|---|---|---|
| A | 3 | This game is too complex for its own good. |
| B | 3 | Wow! The familiar star pattern of Chinese checkers, but for chess. Still, if you can wrap your mind around six people simultaneously playing chess, the interface is good. Good luck! |
| D | 4 | I would like to find the time to master this game. It is quite the challenge. But, if the game is difficult, the developers have done a great job with the interface and the graphics. |
| E | 5 | Great, challenging game. Interface works wonderfully. Nice graphics. I played it on a tablet with some friends while taking the train from New York to Chicago. Didn't drain the battery. |

Pig Parlor

| Aggregate Score for Application | Total Number of Evaluations With Scores |
|---|---|
| 2.25 | 4 |

| Topic | Aggregate Score Associated With Topic | Effect of Topic on Aggregate Score for Application | Comparison With Applications in Category |
|---|---|---|---|
| Usability | 2.67 | +0.31 | -0.79 |
| Stability | 1.50 | -0.38 | -2.07 |
| Resource Usage | 1.50 | -0.38 | -1.88 |
| Level | 2.25 | 0.00 | |
| Graphics | 3.00 | +0.38 | |

PRIORITIZING TOPICS OF INTEREST DETERMINED FROM PRODUCT EVALUATIONS

CROSS-REFERENCE TO RELATED APPLICATIONS

This application claims, under 35 U.S.C. § 119(e), the benefit of U.S. Provisional Application No. 62/337,982, filed May 18, 2016, the disclosure of which is incorporated herein in its entirety by reference.

TECHNICAL FIELD

The disclosed subject matter is related to at least the technical fields of application evaluation systems, digital distribution systems, application development systems, and distributed computing systems.

BACKGROUND

Application software products (i.e., applications) have been developed to perform a variety of functions related to, for example, word processing, spreadsheets, slide show presentations, database management, electronic mail, Internet access, business productivity, educational assistance, health and fitness management, providing digital content (such as, for example, text, pictures, audio, video, and electronic games), navigation, text messaging, access to social media networks, etc. Often, entities, such as developers, that prepare, maintain, or own such applications want or need to provide updates to them. Such updates can be made for a variety of reasons including, for example, to fix software bugs, to add features, to address issues related to security, and to ensure compatibility with changes to operating systems used to run the corresponding applications.

Additionally, the advancement of electronic communication network bandwidth capabilities in the last decade has enabled the delivery of applications to shift from being primarily performed via physical data storage devices (such as, for example, floppy disks, compact discs, digital versatile discs, and Universal Serial Bus flash drives) to being performed via online distribution in which developers can upload applications to a digital distribution platform and users can download applications from the digital distribution platform. Online distribution has also allowed applications to be updated at an increasingly frequent rate.

BRIEF SUMMARY

According to an implementation of the disclosed subject matter, in a method for producing a measurement of an effect of a topic on an aggregate of numerical information related to a set of evaluations of a specific product, a subset of the set of the evaluations can be determined by a first computer system. The subset can be defined by inclusion of textual information about the topic. The set can be stored in records in an electronic database. The specific product can be a good, a service, an application software product, the like, or any combination thereof. An aggregate of the numerical information related to the subset can be determined by the first computer system. Based on the aggregate of the numerical information related to the subset, the measurement of the effect of the topic on the aggregate of the numerical information related to the set can be calculated by the first computer system. The measurement can be included, by the first computer system, in a file to be transmitted to a second computer system to be used to control operations performed by the second computer system to produce a modification to the specific product.

According to an implementation of the disclosed subject matter, in a non-transitory computer-readable medium storing computer code for controlling a processor to cause the processor to produce a measurement of an effect of a topic on an aggregate of numerical information related to a set of evaluations of a specific product, the computer code can include instructions to cause the processor to determine a subset of the set of the evaluations. The subset can be defined by inclusion of textual information about the topic. The set can be stored in records in an electronic database. The specific product can be a good, a service, an application software product, the like, or any combination thereof. The computer code can include instructions to cause the processor to determine an aggregate of the numerical information related to the subset. The computer code can include instructions to cause the processor to calculate, based on the aggregate of the numerical information related to the subset, the measurement of the effect of the topic on the aggregate of the numerical information related to the set. The computer code can include instructions to cause the processor to include the measurement in a file to be transmitted to a computer system to be used to control operations performed by the computer system to produce a modification to the specific product.

According to an implementation of the disclosed subject matter, a system for producing a measurement of an effect of a topic on an aggregate of numerical information related to a set of evaluations of a specific product can include a memory and a processor. The memory can be configured to store the set of the evaluations of the specific product as records in an electronic database. The specific product can be a good, a service, an application software product, the like, or any combination thereof. The memory can be configured to store the measurement of the effect of the topic on the aggregate of the numerical information related to the set of the evaluations. The processor can be configured to determine a subset of the set of the evaluations. The subset can be defined by inclusion of textual information about the topic. The processor can be configured to determine an aggregate score for the subset. The processor can be configured to calculate, based on the aggregate of the numerical information related to the subset, the measurement of the effect of the topic on the aggregate of the numerical information related to the set. The processor can be configured to include the measurement in a file to be transmitted to a computer system to be used to control operations performed by the computer system to produce a modification to the specific product.

According to an implementation of the disclosed subject matter, a system for producing a measurement of an effect of a topic on an aggregate of numerical information related to a set of evaluations of a specific product can include means for determining a subset of the set of the evaluations. The subset can be defined by inclusion of textual information about the topic. The set can be stored in records in an electronic database. The specific product can be a good, a service, an application software product, the like, or any combination thereof. The system can include means for determining an aggregate of the numerical information related to the subset. The system can include means for calculating, based on the aggregate of the numerical information related to the subset, the measurement of the effect of the topic on the aggregate of the numerical information related to the set. The system can include means for including in a file to be transmitted to a computer system to be used to control operations performed by the computer system to produce a modification to the specific product.

Additional features, advantages, and aspects of the disclosed subject matter are set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate aspects of the disclosed subject matter and together with the detailed description serve to explain the principles of aspects of the disclosed subject matter. No attempt is made to show structural details in more detail than may be necessary for a fundamental understanding of the disclosed subject matter and various ways in which it may be practiced.

FIG. 2 is a diagram illustrating examples of records in an implementation of an electronic database of an evaluation system.

FIG. 3 is a diagram illustrating an example of a web screen associated with an interface, of a first computer system and accessible by a second computer system, to present information from evaluations of a specific product.

DETAILED DESCRIPTION

Figure 1:
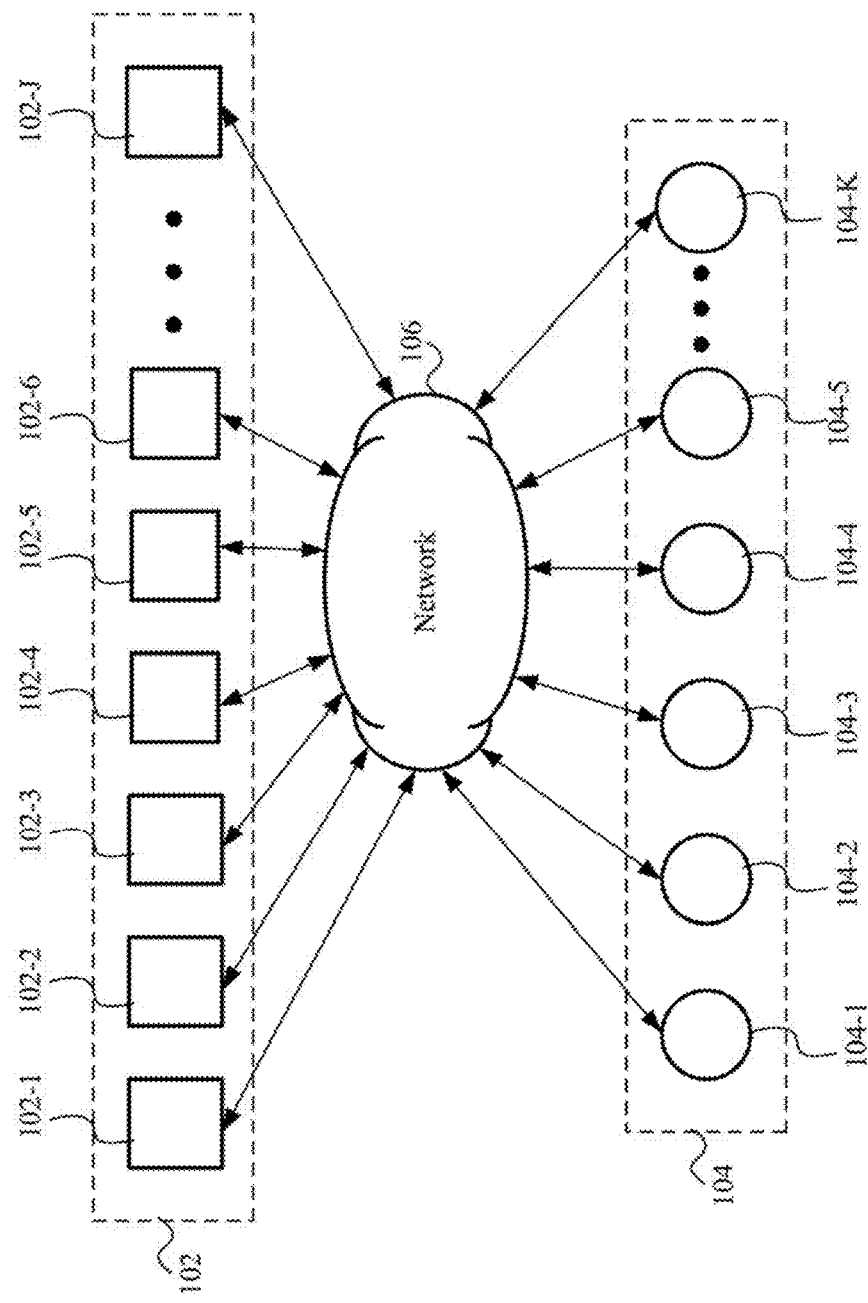
FIG. 1 is a diagram illustrating an example of a distributed computing system in which a measurement of an effect of a topic on an aggregate of numerical information related to a set of evaluations of a specific product can be produced.

An application development system can be an electronic system configured to develop, test, monitor, and update an application. After the application has been developed, the application development system can upload, via a network, the application to a digital distribution platform. The digital distribution platform can be an application marketplace, online store, or other distribution system. Having the application available for distribution by the digital distribution platform can be referred to as publishing the application. A user device can download, via the network, the application from the digital distribution platform.

Once the application has been published, one or more evaluation systems can be used by various entities to provide evaluations of the application. Such an evaluation system usually can include a graphical user interface configured to allow prospective evaluators to interact with the evaluation system to provide evaluations. In this manner, a user device can upload, via the network, an evaluation of the application to an evaluation system. Via the one or more evaluation systems, the evaluations of the application can be crowd-sourced.

Online distribution can allow applications to be updated at an increasingly frequent rate. This ability has fostered the development of an expectation that updates, for example, to fix software bugs, to add features, to address issues related to security, and to ensure compatibility with changes to operating systems used to run the corresponding applications should be performed soon after such issues have been identified.

Evaluations of applications can be an important tool for identifying issues with applications. The digital distribution platform can be configured to access, from the one or more evaluation systems and via the network, the evaluations of the application. The digital distribution platform can be configured to include an interface, accessible by the application development system, to present the evaluations of the application. The digital distribution platform can be configured to transmit, via the network, information from the evaluations of the application to the application development system. The application development system can be configured to use the information from the evaluations of the application to control operations performed by the application development system to produce an upgrade instruction for the application.

Unfortunately, the large number of evaluations of applications can complicate efforts to identify, in the evaluations of the applications, information useful to control operations performed by application development systems to produce upgrade instructions for the applications. For example, one commercial digital distribution platform has access to over three billion scores of applications included in evaluations of the applications.

This situation gives rise to the specific problem of providing, from evaluations of applications, information useful to control operations performed by application development systems to produce upgrade instructions for the applications. This specific problem is rooted in: (1) the use of evaluations of applications in operations performed by application development systems to produce upgrade instructions for the applications and (2) the complications associated with identifying, in the evaluations of the applications, information useful to control the operations performed by the application development systems to produce the upgrade instructions for the applications.

In contrast, according to the disclosed subject matter, a measurement of an effect of a topic on an aggregate of numerical information (e.g., score) related to a set of evaluations of a specific product can be produced. The set of the evaluations of the specific product can be stored in records in an electronic database. The specific product can be a good, a service, an application software product, the like, or any combination thereof. A subset of the set of the evaluations can be determined. The subset can be defined by inclusion of textual information about the topic. An aggregate of the numerical information related to the subset can be determined. Based on the aggregate of the numerical information related to the subset, the measurement of the effect of the topic on the aggregate of the numerical information related to the set can be calculated. The measurement can be included in a file to be transmitted to a computer system (e.g., application development system) to be used to control operations performed by the computer system to produce a modification to the specific product.

Additionally, in an aspect, the specific product can be included in a category of products. A measurement of an effect of a second topic on the aggregate of the numerical information related to the set of the evaluations can be produced. For example, the second topic can be related to an issue with the products included in the category. The measurement of the effect of the second topic can be included in the file to be transmitted to the computer system to be used to control the operations performed by the computer system to produce the modification to the specific product.

Moreover, according to the disclosed subject matter, a measurement of an effect of the second topic on an aggregate of the numerical information related to a subset, of the set of the evaluations, related to the second topic can be produced. The measurement of the effect of the second topic on the aggregate of the numerical information related to the subset can be included in the file to be transmitted to the computer system to be used to control the operations performed by the computer system to produce the modification to the specific product.

Although the following description explains the disclosed subject matter in terms of game applications, the teachings described herein apply to other types of applications and, more generally, apply to other types of products, including goods, services, applications, or any combination thereof.

FIG. 1 is a diagram illustrating an example of a distributed computing system 100 in which a measurement of an effect of a topic on an aggregate of numerical information related to a set of evaluations of a specific product can be produced. The distributed computing system 100 can include several elements such as, for example, a plurality of platforms 102 and a plurality of user devices 104. In an aspect, an element of the distributed computing system 100 can be communicatively connected to one or more other elements via a network 106. The plurality of platforms 102 can include, for example, a platform 102-1, a platform 102-2, a platform 102-3, a platform 102-4, a platform 102-5, a platform 102-6, . . . , and a platform 102-J. The plurality of user devices 104 can include, for example, a user device 104-1, a user device 104-2, a user device 104-3, a user device 104-4, a user device 104-5, . . . , and a user device 104-K.

In general, each of the plurality of platforms 102 can be a computer-implemented platform configured to automatically perform some or all of the functions disclosed herein. For example, for descriptive purposes herein, the platform 102-1 can be, for example, a combination of hardware architecture, operating system, runtime libraries, and/or computer software or code object to support an evaluation system. In an implementation, the platform 102-1 can be configured specifically to support evaluation operations. For example, for descriptive purposes herein, the platform 102-2 can be, for example, a combination of hardware architecture, operating system, runtime libraries, and/or computer software or code object to support a digital distribution system. In an implementation, the platform 102-2 can be configured specifically to support digital distribution operations. For example, for descriptive purposes herein, the platform 102-3 can be, for example, a combination of hardware architecture, operating system, runtime libraries, and/or computer software or code object to support an application development system for a game application for High-Heeled Horseshoes, a game application for a game for children. In an implementation, the platform 102-3 can be configured specifically to support application development operations for High-Heeled Horseshoes. For example, for descriptive purposes herein, the platform 102-4 can be, for example, a combination of hardware architecture, operating system, runtime libraries, and/or computer software or code object to support an application development system for a game application for Karate Cow, a game application for a game for children. In an implementation, the platform 102-4 can be configured specifically to support application development operations for Karate Cows. For example, for descriptive purposes herein, the platform 102-5 can be, for example, a combination of hardware architecture, operating system, runtime libraries, and/or computer software or code object to support an application development system for a game application for Pig Parlor, a game application for a game for children. In an implementation, the platform 102-5 can be configured specifically to support application development operations for Pig Parlor. For example, for descriptive purposes herein, the platform 102-6 can be, for example, a combination of hardware architecture, operating system, runtime libraries, and/or computer software or code object to support an application development system for a game application for Chinese Chess, a game application for a game for adults. In an implementation, the platform 102-6 can be configured specifically to support application development operations for Chinese Chess. Alternatively, the functions performed by any two or more of the plurality of platforms 102 can be performed by a single platform.

In general, any of the plurality of user devices 104 can be, for example, any suitable electronic client device, such as a smartphone, a cellular phone, a personal digital assistant (PDA), a wireless communication device, a handheld device, a desktop computer, a laptop computer, a netbook, a tablet computer, a web portal, a digital video recorder, a video game console, an e-book reader, etc. For example, any of the plurality of user devices 104 can be a game platform. Any of the plurality of user devices 104 can be associated with one or more users. Likewise, a single user can be associated with one or more of the plurality of user devices 104. However, for descriptive purposes herein, the user device 104-1 can be associate with an evaluator named Alice, the user device 104-2 can be associated with an evaluator named Brad, the user device 104-3 can be associated with an evaluator named Charlie, the user device 104-4 can be associated with an evaluator named Darla, and the user device 104-5 can be associated with an evaluator named Edgar.

The network 106 can be, for example, a telecommunications network configured to allow computers to exchange data. Connections between elements of the distributed computing system 100 via the network 106 can be established using cable media, wireless media, or both. Data traffic on the network 106 can be organized according to a variety of communications protocols including, but not limited to, the Internet Protocol Suite (Transmission Control Protocol/Internet Protocol (TCP/IP)), the Institute of Electrical and Electronics Engineers (IEEE) 802 protocol suite, the synchronous optical networking (SONET) protocol, the Asynchronous Transfer Mode (ATM) switching technique, or any combination thereof. In an aspect, the network 106 can include the Internet.

Advantageously, with respect to the distributed computing system 100, having a measurement of an effect of a topic on an aggregate of numerical information related to a set of evaluations of a specific product, for example, an application produced by the platform 102-2, rather than by one or more of the plurality of user devices 104, can free bandwidth between the platform 102-2 and the one or more of the plurality of user devices 104 to convey information other than the information needed to produce the measurement of the effect of the topic on the aggregate of the numerical information related to the set of the evaluations of the specific product. Advantageously, having the measurement of the effect of the topic on the aggregate of the numerical information related to the set of evaluations of the specific product, for example, an application produced by the platform 102-2, rather than by one or more of the plurality of client devices 104, can preclude processors of the one or more of the plurality of client devices 104 from performing operations to produce the measurement of the effect of the topic on the aggregate of the numerical information related to the set of the evaluations of the specific product, which can prolong the lives of these processors. Additionally or alternatively, if any of the one or more of the plurality of client devices 104 receives power from a portable energy source, such as a battery or a fuel cell, then precluding the processors of the one or more of the plurality of client devices 104 from performing operations to produce the measurement of the effect of the topic on the aggregate of the numerical information related to the set of the evaluations of the specific product can prolong a duration of time before the portable energy source would need to be replenished. Additionally or alternatively, having the measurement of the effect of the topic on the aggregate of the numerical information related to the set of the evaluations of the specific product, for example an application produced by the platform 102-2, rather than by one or more of the plurality of client devices 104, can free the processors of the one or more of the plurality of client devices 104 to perform other operations.

FIG. 2 is a diagram illustrating examples of records in an implementation of an electronic database of an evaluation system. The evaluation system can be supported, for example, by the platform 102-1. For example, for descriptive purposes herein, four tables of records of evaluations of game applications are illustrated in FIG. 2: in a view (a), a table 202 for records of evaluations of High-Heeled Horseshoes; in a view (b), a table 204 for records for evaluations of Karate Cows; in a view (c), a table 206 for records for evaluations of Pig Parlor; and in a view (d), a table 208 for records for evaluations of Chinese Chess. For example, each of the records can include a field 210 for textual information of the corresponding evaluation, a field 212 for numerical information (e.g., a score) related to the corresponding evaluation, and a field 214 for a value associated with an identity of an individual from which the corresponding evaluation was received. For example, for descriptive purposes herein, a character string can be a value such that the character string A can be associated with Alice, the character string B can be associated with Brad, the character string C can be associated with Charlie, the character string D can be associated with Darla, and the character string E can be associated with Edgar. The value associated with the identity of the individual can be a key used by the corresponding table of the electronic database to cross reference to another table (not illustrated). The other table can include, for each evaluator, a record of usernames, for example, associated with the identity of the individual. In this manner, the individual can be identified if any of the usernames in the record is used regardless of which one of the plurality of user devices 104 is used.

The table 202 for the records of the evaluations of High-Heeled Horseshoes can include, for descriptive purposes herein, a record 216 for an evaluation received from Alice, a record 218 for an evaluation from Brad, a record 220 for an evaluation from Charlie, a record 222 for an evaluation from Darla, and a record 224 for an evaluation from Edgar. The table 204 for the records of the evaluations of Karate Cows can include, for descriptive purposes herein, a record 226 for an evaluation from Alice, a record 228 for an evaluation from Brad, a record 230 for an evaluation from Charlie, and a record 232 for an evaluation from Edgar. The table 206 for the records of the evaluations of Pig Parlor can include, for descriptive purposes herein, a record 234 for an evaluation from Alice, a record 236 for an evaluation from Charlie, a record 238 for an evaluation from Darla, and a record 240 for an evaluation from Edgar. The table 208 for the records of the evaluations of Chinese Chess can include, for descriptive purposes herein, a record 242 for an evaluation from Alice, a record 244 for an evaluation from Brad, a record 246 for an evaluation from Darla, and a record 248 for an evaluation from Edgar.

FIG. 3 is a diagram illustrating an example of a web screen 300 associated with an interface, of first computer system (e.g., a digital distribution platform) and accessible by a second computer system (e.g., an application development system), to present information from evaluations of a specific product (e.g., application). For example, for descriptive purposes herein, the web screen 300 can be associated with an interface, of the digital distribution platform 102-2 and accessible by the platform 102-5, to present information from evaluations of the game application for Pig Parlor.

Figure 4:
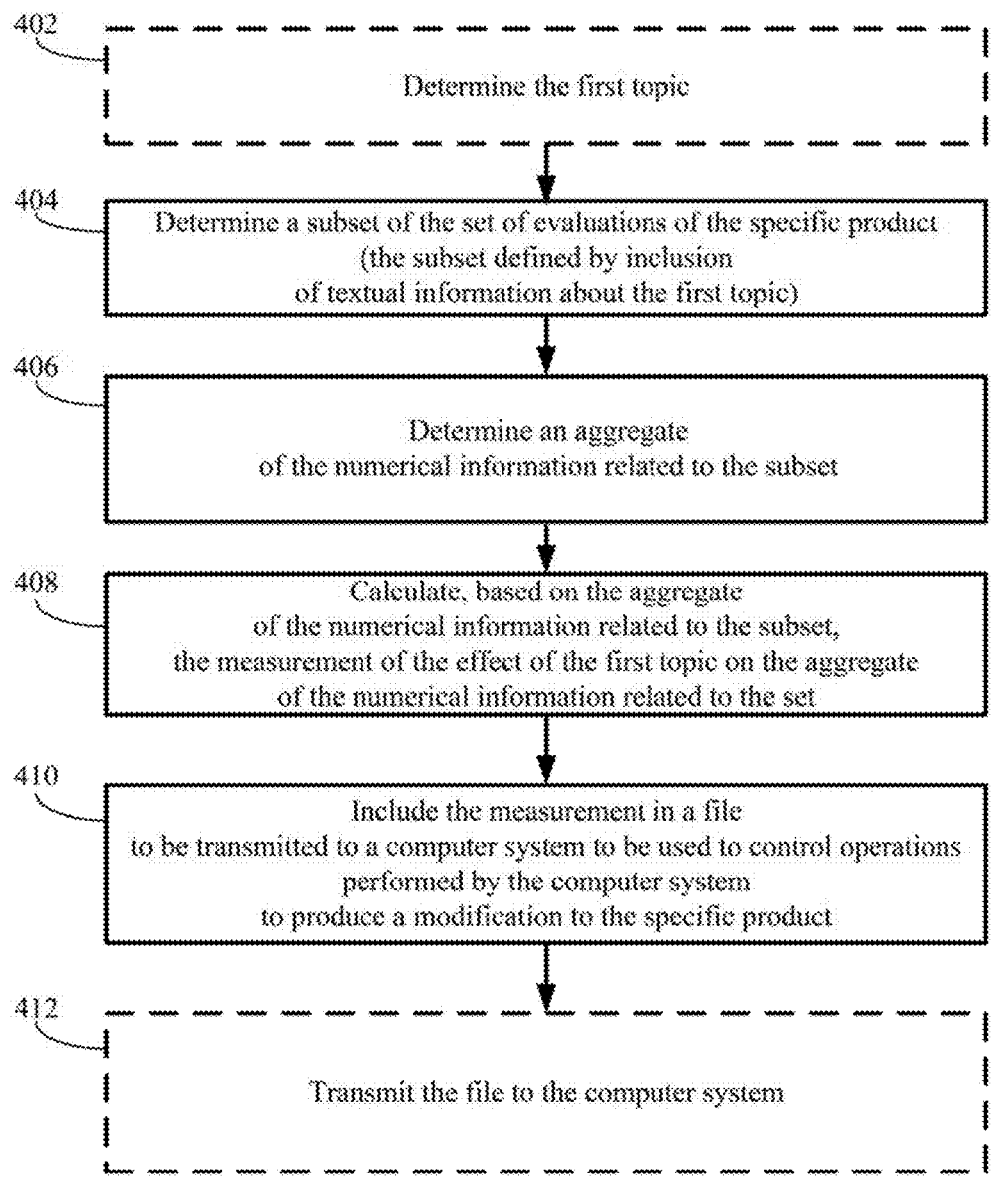
FIG. 4 is a flow diagram illustrating an example of a method for producing a measurement of an effect of a first topic on an aggregate of numerical information related to a set of evaluations of a specific product.

FIG. 4 is a flow diagram illustrating an example of a method 400 for producing a measurement of an effect of a first topic on an aggregate of numerical information related to a set of evaluations of a specific product. The specific product can be a good, a service, an application software product, the like, or any combination thereof. The set can be stored in records in an electronic database. The numerical information can include one or more scores included in one or more of the evaluations of the specific product. Additionally or alternatively, the numerical information can include an amount of money expended, related to the specific product, from an account related to one or more of the evaluations of the specific product. For example, an entity associated with the second computer system may desire to prioritize topics of interest to those individuals who have spent relatively large amounts of money related to the specific product. Additionally or alternatively, the numerical information can include an amount of time expended accessing, from an account related to one or more of the evaluations of the specific product, a web site of a provider of the specific product. For example, the entity associated with the second computer system may desire to prioritize topics of interest to those individuals who have spent relatively large amounts of time accessing the web site of the entity. Additionally or alternatively, the numerical information can include a number of followers of a social media account related to one or more of the evaluations of the specific product. For example, the entity associated with the second computer system may desire to prioritize topics of interest to those individuals who have a relatively large number of followers of a social media account.

In an aspect, the first computer system can include a digital distribution platform, the specific product can be an application software product, the second computer system can include an application development system, and the modification can be an upgrade instruction. For example, with reference to FIGS. 1 through 3 and for descriptive purposes herein, the specific product can be Pig Parlor, which can be supported by the platform 102-5. The set of evaluations of Pig Parlor can be stored in the records 234, 236, 238, and 240. The field 212 of the record 234 can include the score 2, the field 212 of the record 236 can include the score 1, the field 212 of the record 238 can include the score 2, and the field 212 of the record 240 can include the score 4. The records 234, 236, 238, and 240 can be stored in an electronic database. The electronic database can be associated with an evaluation system. The evaluation system can be supported, for example, by the platform 102-1. The digital distribution platform can be, for example, the platform 102-2.

Returning to FIG. 4, in the method 400, at an optional operation 402, the first topic can be determined by the first computer system (e.g., the digital distribution platform). For example, the first topic can be determined using a term frequency-inverse document frequency (tf-idf) technique. Additionally or alternatively, the first topic can be determined using an automatic document classification technique. The automatic document classification technique can be an unsupervised automatic document classification technique, a supervised automatic document classification technique, or both.

Figure 5:
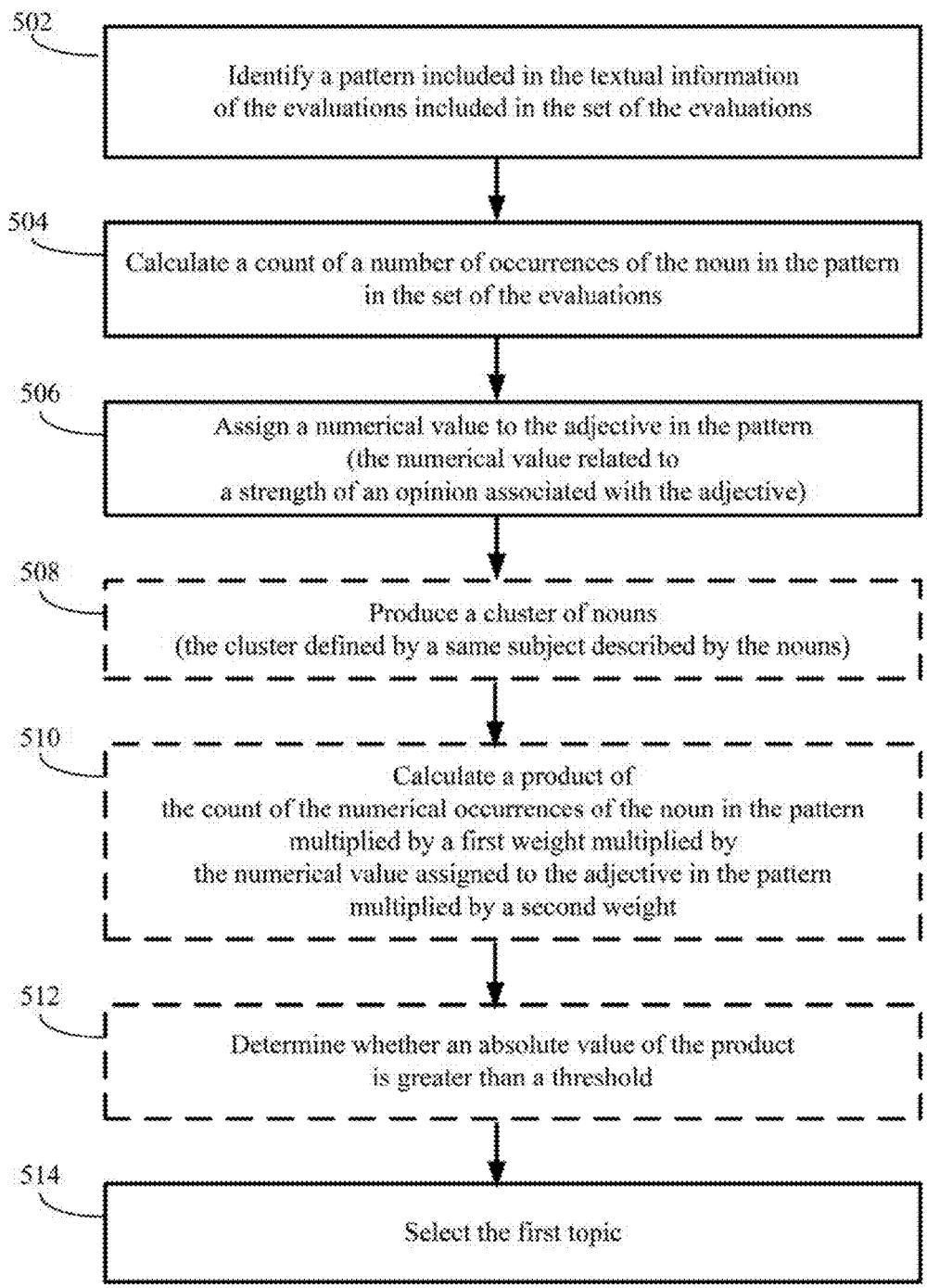
FIG. 5 is a flow diagram illustrating an example of a method for determining the first topic.

FIG. 5 is a flow diagram illustrating an example of a method 402 for determining the first topic. In the method 402, at an operation 502, a pattern included in the textual information of the evaluations included in the set of the evaluations can be identified by the first computer system. The pattern can be a pattern in parts of speech. The pattern can include a noun and an adjective. For example, the pattern can include a first pattern, a second pattern, or both. The first pattern can have an adjective followed by a noun. The second pattern can have a noun followed by a verb followed by an adjective. In an aspect, the pattern can include a plurality of patterns. Each of the plurality of patterns can include a corresponding noun and a corresponding adjective. For example, with reference to FIG. 2 and for descriptive purposes herein, the field 210 of the record 234 includes three examples of the first pattern: "mud bath," "first level," and "crazy level;" the field 210 of the record 236 includes one example of the first pattern: "Resource Hog;" the field 210 of the record 238 includes four examples of the first pattern: "Amazing graphics," "children's game," "running applications," and "third level;" and the field 210 of the record 240 includes six examples of the first pattern: "second level," "pig's face," "curling iron," "wonderful picture," "picture quality," and "great interface." Additionally, the field 210 of the record 234 includes one example of the second pattern: "level was easy;" the field 210 of the record 236 includes one example of the second pattern: "level crashed hard;" the field 210 of the record 238 includes one example of the second pattern: "level is difficult;" and the field 210 of the record 240 includes two examples of the second pattern: "level is fun" and "tail is priceless."

Returning to FIG. 5, at an operation 504, a count of a number of occurrences of the noun in the pattern in the set of the evaluations can be calculated by the first computer system. In the aspect in which the pattern includes a plurality of patterns such that each of the plurality of patterns includes a corresponding noun and a corresponding adjective, the first computer system can calculate a count of a number of occurrences for each corresponding noun. For example, with reference to FIG. 2 and for descriptive purposes herein, the count of the number of occurrences of the noun "bath" is 1, the count of the number of occurrences of the noun "level" is 8, the count of the number of occurrences of the noun "hog" is 1, the count of the number of occurrences of the noun "graphics" is 1, the count of the number of occurrences of the noun "game" is 1, the count of the number of occurrences of the noun "applications" is 1, the count of the number of occurrences of the noun "face" is 1, the count of the number of occurrences of the noun "iron" is 1, the count of the number of occurrences of the noun "picture" is 1, the count of the number of occurrences of the noun "quality" is 1, the count of the number of occurrences of the noun "interface" is 1, and the count of the number of occurrences of the noun "tail" is 1.

Returning to FIG. 5, at an operation 506, a numerical value can be assigned to the adjective in the pattern by the first computer system. The numerical value can be related to a strength of an opinion associated with the adjective. In the aspect in which the pattern includes a plurality of patterns such that each of the plurality of patterns includes a corresponding noun and a corresponding adjective, the first computer system can assign a numerical value for each corresponding adjective. For example, with reference to FIG. 2 and for descriptive purposes herein, a numerical value of 0 can be assigned to the adjective "mud" because this adjective may not be associated with an opinion, a numerical value of 0 can be assigned to the adjective "first" because this adjective may not be associated with an opinion, a numerical value of −2 can be assigned to the adjective "crazy" because this adjective can be associated with a strong negative opinion, a numerical value of 0 can be assigned to the adjective "resource" because this adjective may not be associated with an opinion, a numerical value of +2 can be assigned to the adjective "amazing" because this adjective can be associated with a strong positive opinion, a numerical value of 0 can be assigned to the adjective "children's" because this adjective may not be associated with an opinion, a numerical value of 0 can be assigned to the adjective "running" because this adjective may not be associated with an opinion, a numerical value of 0 can be assigned to the adjective "third" because this adjective may not be associated with an opinion, a numerical value of 0 can be assigned to the adjective "second" because this adjective may not be associated with an opinion, a numerical value of 0 can be assigned to the adjective "pig's" because this adjective may not be associated with an opinion, a numerical value of 0 can be assigned to the adjective "curling" because this adjective may not be associated with an opinion, a numerical value of +2 can be assigned to the adjective "wonderful" because this adjective can be associated with a strong positive opinion, a numerical value of 0 can be assigned to the adjective "picture" because this adjective may not be associated with an opinion, a numerical value of +2 can be assigned to the adjective "great" because this adjective can be associated with a strong positive opinion, a numerical value of +1 can be assigned to the adjective "easy" because this adjective can be associated with a generally positive opinion, a numerical value of −1 can be assigned to the adjective "hard" because this adjective can be associated with a generally negative opinion, a numerical value of −1 can be assigned to the adjective "difficult" because this adjective can be associated with a generally negative opinion, a numerical value of +1 can be assigned to the adjective "fun" because this adjective can be associated with a generally positive opinion, and a numerical value of +2 can be assigned to the adjective "priceless" because this adjective can be associated with a strong positive opinion.

Returning to FIG. 5, in the aspect in which the pattern includes a plurality of patterns such that each of the plurality of patterns includes a corresponding noun and a corresponding adjective, at an optional operation 508, a cluster of nouns can be produced by the first computer system. The cluster can be defined by a same subject described by the nouns. For example, with reference to FIG. 2 and for descriptive purposes herein, a cluster of nouns can be produced for "graphics" and "picture" because a same subject is described by these nouns.

Returning to FIG. 5, at an optional operation 510, a product can be calculated by the first computer system. The product can be the count of the numerical occurrences of the noun in the pattern multiplied by a first weight multiplied by the numerical value assigned to the adjective in the pattern multiplied by a second weight. For example, with reference to FIG. 2 and for descriptive purposes herein, with the first weight set to +2 and the second weight set to +1, a product for the pattern "mud bath" is 0 (1×2×0×1), a product for the pattern "first level" is 0 (8×2×0×1), a product for the pattern "crazy level" is −32 (8×2×−2×1), a product for the pattern "Resource Hog" is 0 (1×2×0×1), a product for the pattern "Amazing graphics" is +4 (1×2×+2×1), a product for the pattern "children's game" is 0 (1×2×0×1), a product for the pattern "running applications" is 0 (1×2×0×1), a product for the pattern "third level" is 0 (8×2×0×1), a product for the pattern "second level" is 0 (8×2×0×1), a product for the pattern "pig's face" is 0 (1×2×0×1), a product for the pattern "curling iron" is 0 (1×2×0×1), a product for the pattern "wonderful picture" is +4 (1×2×+2×1), a product for the pattern "picture quality" is 0 (1×2×0×1), a product for the pattern "great interface" is +4 (1×2×+2×1), a product for the pattern "level was easy" is +16 (8×2×+1×1), a product for the pattern "level crashed hard" is −16 (8×2×−1×1), a product for the pattern "level is difficult" is −16 (8×2×−1×1), a product for the pattern "level is fun" is +16 (8×2×+1×1), and a product for the pattern "tail is priceless" is +4 (1×2×+2×1).

Returning to FIG. 5, at an optional operation 512, the first computer system can determine whether an absolute value of the product is greater than a threshold. For example, with reference to FIG. 2 and for descriptive purposes herein, with the threshold set to 6, the absolute value for the product for the pattern "crazy level," 32, is greater than the threshold, the absolute value for the product for the pattern "level was easy," 16, is greater than the threshold, the absolute value for the product for the pattern "level crashed hard," 16, is greater than the threshold, the absolute value for the product for the pattern "level is difficult," 16, is greater than the threshold, and the absolute value for the product for the pattern "level is fun," 16, is greater than the threshold.

Additionally, in the aspect in which a cluster of nouns, defined by a same subject described by the nouns, is produced, the first computer system can calculate a product for the cluster of nouns as a product of the products of the patterns associated with the nouns. For example, with reference to FIG. 2 and for descriptive purposes herein, a cluster of nouns can be produced for "graphics" and "picture" because a same subject is described by these nouns. A product for the cluster of "graphics" and "picture" can be a product of: (1) the product for the pattern "Amazing graphics," +4, multiplied by (2) the product for the pattern "wonderful picture," +4: +16. In the aspect in which the cluster of nouns is produced, the first computer system can determine whether the absolute value of the product for the cluster of nouns is greater than the threshold. For example, with reference to FIG. 2 and for descriptive purposes herein, with the threshold set to 6, the absolute value for the product for the cluster of "graphics" and "picture," 16 is greater than the threshold.

Returning to FIG. 5, at an operation 514, the first topic can be selected by the first computer system. The first topic can be selected based on the number of occurrences of the noun in the pattern and based on the numerical value assigned to the adjective in the pattern. If the method 402 includes the optional operations 510 and 512, then the first computer system can select the first topic by identifying the noun in the pattern as the first topic in response to the absolute value of the product of the pattern being greater than the threshold. For example, with reference to FIG. 2 and for descriptive purposes herein, with the threshold set to 6, the first computer system can identify "level" as the first topic in response to the absolute value of the product of each of the patterns "crazy level" (32), "level was easy" (16), "level crashed hard" (16), "level is difficult" (16), and "level is fun" (16) being greater than the threshold (6). Returning to FIG. 5, additionally, if the method 402 includes the optional operation 508, then the first topic can be selected based on the cluster of the nouns. For example, with reference to FIG. 2 and for descriptive purposes herein, with the threshold set to 6, the first computer system can identify "graphics" (or "picture") as the first topic in response to the absolute value of the product for the cluster of "graphics" and "picture" (16) being greater than the threshold (6).

Returning to FIG. 4, at an operation 404, a subset of the set of the evaluations of the specific product can be determined by the first computer system. The subset can be defined by inclusion of textual information about the first topic. For example, with reference to FIG. 2 and for descriptive purposes herein, with the first topic determined to be "graphics," the subset of the set of evaluations of Pig Parlor can be defined by inclusion of textual information about graphics. For example, the field 210 of the record 238 includes textual information about graphics ("Amazing graphics") and the field 210 of the record 240 includes textual information about graphics ("Wonderful picture quality").

Figure 6:
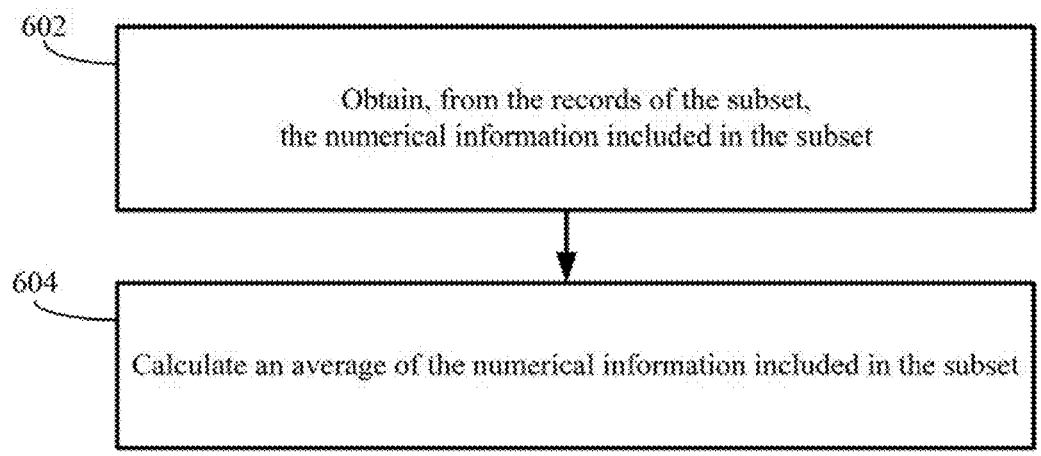
FIG. 6 is a flow diagram illustrating an example of a method for determining the aggregate of the numerical information related to the subset of the set of evaluations of the specific product.

Returning to FIG. 4, at an operation 406, an aggregate of the numerical information related to the subset can be determined by the first computer system. FIG. 6 is a flow diagram illustrating an example of a method 406 for determining the aggregate of the numerical information related to the subset of the set of evaluations of the specific product. In the method 406, at an operation 602, the numerical information included in the subset can be obtained, by the first computer system, from the records of the subset. For example, with reference to FIG. 2 and for descriptive purposes herein, with the first topic determined to be "graphics," the score 2 can be obtained from the field 212 of the record 238 and the score 4 can be obtained from the field 212 of the record 240. Returning to FIG. 6, at an operation 604, an average of the numerical information included in the subset can be calculated by the first computer system. For example, with reference to FIG. 2 and for descriptive purposes herein, the first computer system can calculate the average of the scores 2 and 4 to be 3.00. FIG. 3 illustrates that the web screen 300 can present 3.00 as the "Aggregate Score Associated with Topic" for the "Topic" of "Graphics." In a similar manner, the aggregate of the numerical information related to the subset defined by inclusion of textual information about the first topic "level" can be determined to be 2.25, which can be presented on the web screen 300 as the "Aggregate Score Associated With Topic" for the "Topic" of "Level."

Returning to FIG. 4, at an operation 408, the measurement of the effect of the first topic on the aggregate of the numerical information related to the set can be calculated, by the first computer system, based on the aggregate of the numerical information related to the subset. For example, the first computer system can calculate the measurement of the effect of the first topic by multiplying a difference by a quotient. The difference can be the aggregate of the numerical information related to the set subtracted from the aggregate of the numerical information related to the subset. The quotient can be a count of a number of the evaluations included in the subset divided by a count of a number of the evaluations included in the set. For example, with reference to FIGS. 2 and 3 and for descriptive purposes herein, with the first topic determined to be "graphics," the first computer system can calculate the measurement of the effect of the first topic "graphics" by multiplying the difference of the aggregate of the numerical information related to the set (presented on the web screen 300 as the "Aggregate Score for Application:" 2.25) subtracted from the aggregate of the numerical information related to the subset (presented on the web screen 300 as the "Aggregate Score Associated With Topic" for the "Topic" of "Graphics;" 3.00), +0.75, by the quotient of the count of the number of the evaluations included in the subset (records 238 and 240) divided by the count of the number of the evaluations included in the set (records 234, 236, 238, and 240), 0.5, to yield the product +0.38. For example, FIG. 3 illustrates that the web screen 300 can present 4 as the "Total Number of Evaluations With Scores" and can present +0.38 as the "Effect of Topic on Aggregate Score for Application" for the "Topic" of "Graphics." In a similar manner, the measurement of the effect of the first topic "level" can be calculated to be 0.00, which can be presented on the web screen 300 as the "Effect of Topic on Aggregate Score for Application" for the "Topic" of "Level."

Returning to FIG. 4, at an operation 410, the measurement can be included, by the first computer system, in a file to be transmitted to a second computer system to be used to control operations performed by the second computer system to produce a modification to the specific product. For example, the file can be a comma-separated values file. At an optional operation 412, the file can be transmitted from the first computer system to the second computer system. For example, with reference to FIG. 1 and for descriptive purposes herein, the measurement can be included, by the digital distribution platform 102-2, in a file to be transmitted to the platform 102-5, which supports the application development system for Pig Parlor. The file can be transmitted from the digital distribution platform 102-2 via the network 106 to the platform 102-5.

In an aspect, the specific product can be included in a category of products. For example, as described above, each of High-Heeled Horseshoes, Karate Cow, and Pig Parlor are game applications for games for children, while Chinese Chess is a game application for a game for adults. In this example, a category of applications for games for children can include the game applications for High-Heeled Horseshoes, Karate Cow, and Pig Parlor, but can exclude the game application for Chinese Chess.

Figure 7:
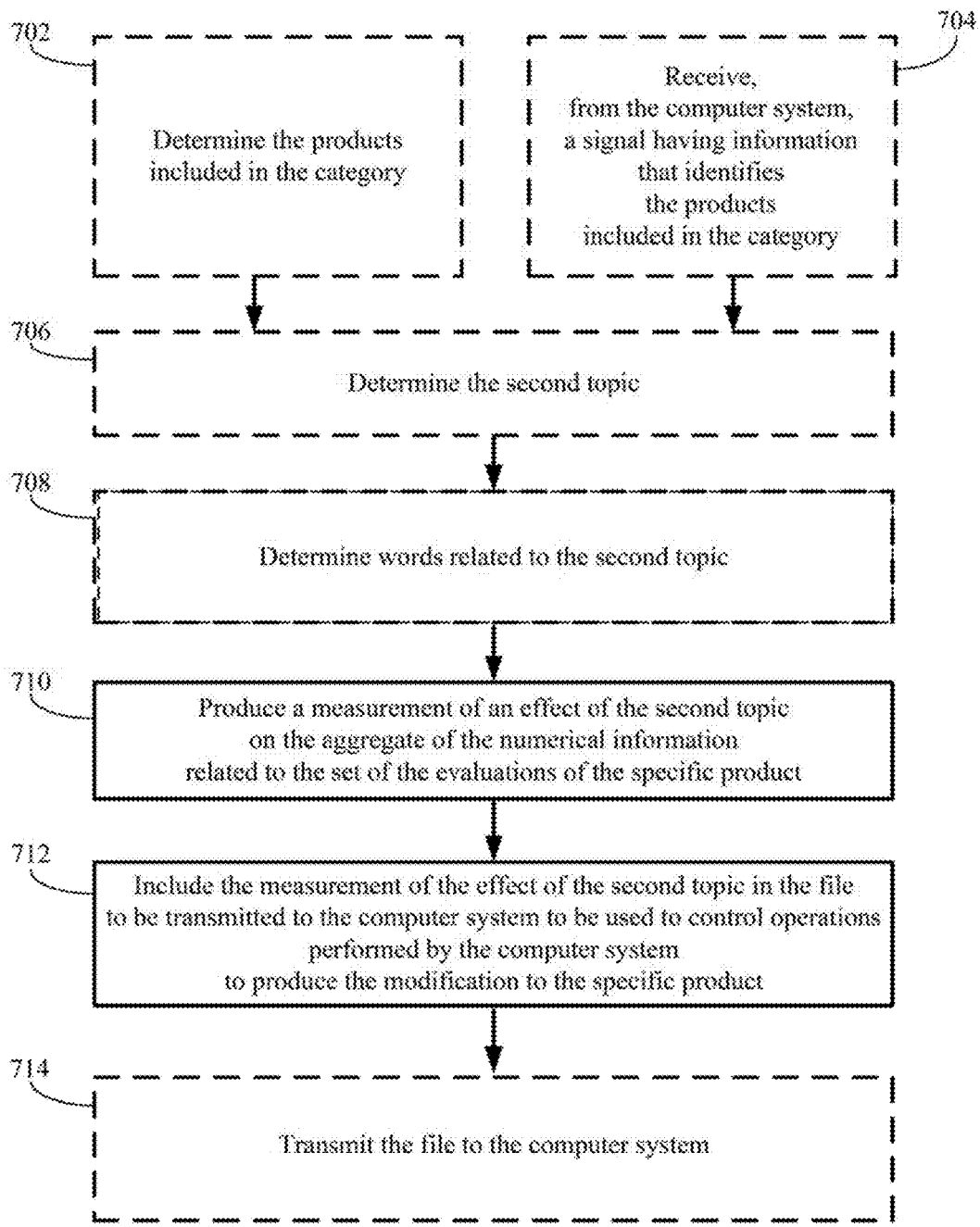
FIG. 7 is a flow diagram illustrating an example of a method for producing a measurement of an effect of a second topic on the aggregate of the numerical information related to the set of evaluations of the specific product.

FIG. 7 is a flow diagram illustrating an example of a method 700 for producing a measurement of an effect of a second topic on the aggregate of the numerical information related to the set of evaluations of the specific product. In the method 700, at an optional operation 702, the products included in the category can be determined by the first computer system. For example, the first computer system can determine the category for the specific product in response to the specific product (e.g., application) having been uploaded, by the second computer system (e.g., application development system) and via the network, to the first computer system (e.g., digital distribution platform).

Additionally or alternatively, at an optional operation 704, a signal from the second computer system can be received by the first computer system. The signal can have information that identifies the products in the category. For example, the second computer system (e.g., application development system) can transmit the signal in conjunction with uploading the specific product (e.g., application) to the first computer system (e.g., digital distribution platform). Additionally or alternatively, the second computer system can transmit the signal at a different time.

At an optional operation 706, the second topic can be determined by the first computer system. The second topic can be predefined. For example, the second topic can be related to an issue with the products included in the category. For example, with reference to FIG. 3 and for descriptive purposes herein, the second topic can be "usability," "stability," and/or "resource usage."

Returning to FIG. 7, at an optional operation 708, words related to the second topic can be determined by the first computer system. The words related to the second topic can be predetermined. For example, the words related to the second topic can be determined using an automatic document classification technique. The automatic document classification technique can be an unsupervised automatic document classification technique, a supervised automatic document classification technique, or both. The automatic document classification technique can include use of a classifier. The classifier can be a linear classifier, a hierarchical classifier, or both. For each second topic, the words related to the second topic can be determined by a corresponding classifier. The automatic document classification technique can be applied to the textual information of the evaluations of the products included in the category. For example, with reference to FIGS. 2 and 3 and for descriptive purposes herein, the automatic document classification technique can be applied to the field 210 of the records 218, 220, 222, 224, 226, 228, 230, 232, 234, 236, 238, and 240.

From such an application of a classifier for the second topic "usability," the first computer system can determine, for example, that the following phrases in the field 210 are related to "usability:" in the records 216, 220, and 224, "easy to play;" in the record 218, "Intuitive interface;" in the record 222, "simple interface;" in the record 226, "easy for them to play;" in the records 228 and 238, "difficult to play;" in the record 230, "as simple as it is to play;" in the record 232, "difficult for small children to play;" in the record 234, "easy to use" and "not able;" and in the record 240, "great interface."

From such an application of a classifier for the second topic "stability," the first computer system can determine, for example, that the following phrases in the field 210 are related to "stability:" in the record 218, "very stable;" in the record 220, "free of bugs;" in the record 222, "did not see any problems with the operations;" in the record 224, "no hang ups;" in the record 232, "Sometimes hangs up;" in the record 234, "application stalled;" and in the record 236, "crashed hard."

From such an application of a classifier for the second topic "resource usage," the first computer system can determine, for example, that the following phrases in the field 210 are related to "resource usage:" in the records 216 and 220, "without draining the battery;" in the record 218, "do not have the effect of slowing other applications;" in the record 224, "easy on the battery;" in the record 228, "consume a high amount of resources;" in the record 230, "uses up way too much memory;" in the record 236, "Resource Hog;" and in the record 238, "bog down other running applications."

Returning to FIG. 7, at an operation 710, the measurement of the effect of the second topic on the aggregate of the numerical information related to the set of the evaluations of the specific product can be produced by the first computer system. For example, as described above, a subset of the set of the evaluations of the specific product can be determined by the first computer system. The subset can be defined by inclusion of textual information about the second topic. For example, with reference to FIG. 2 and for descriptive purposes herein, with the second topic determined to be "stability," the subset of the set of evaluations of Pig Parlor can be defined by inclusion of textual information about stability. For example, the field 210 of the record 234 includes textual information about stability ("application stalled") and the field 210 of the record 236 includes textual information about stability ("crashed hard").

An aggregate of the numerical information (e.g., score) related to the subset can be determined by the first computer system. For example, the score 2 can be obtained from the field 212 of the record 234 and the score 1 can be obtained from the field 212 of the record 236. An average of the scores included in the subset can be calculated: 1.50. FIG. 3 illustrates that the web screen 300 can present 1.50 as the "Aggregate Score Associated with Topic" for the "Topic" of "Stability." In a similar manner, the aggregate score for the subset defined by inclusion of textual information about the second topic "usability" can be determined to be 2.67, which can be presented on the web screen 300 as the "Aggregate Score Associated With Topic" for the "Topic" of "Usability." Likewise, the aggregate score for the subset defined by inclusion of textual information about the second topic "resource usage" can be determined to be 1.50, which can be presented on the web screen 300 as the "Aggregate Score Associated With Topic" for the "Topic" of "Resource Usage."

The measurement of the effect of the second topic on the aggregate of the numerical information related to the set of the evaluations of the specific product can be calculated by the first computer system. For example, with reference to FIGS. 2 and 3 and for descriptive purposes herein, with the second topic determined to be "stability," the first computer system can calculate the measurement of the effect of the second topic "stability" by multiplying the difference of the aggregate score for the set (presented on the web screen 300 as the "Aggregate Score for Application:" 2.25) subtracted from the aggregate score for the subset (presented on the web screen 300 as the "Aggregate Score Associated With Topic" for the "Topic" of "Stability;" 1.50), −0.75, by the quotient of the count of the number of the evaluations included in the subset (records 234 and 236) divided by the count of the number of the evaluations included in the set (records 234, 236, 238, and 240), 0.5, to yield the product −0.38. For example, FIG. 3 illustrates that the web screen 300 can present 4 as the "Total Number of Evaluations With Scores" and can present −0.38 as the "Effect of Topic on Aggregate Score for Application" for the "Topic" of "Stability." In a similar manner, the measurement of the effect of the second topic "usability" can be calculated to be +0.31, which can be presented on the web screen 300 as the "Effect of Topic on Aggregate Score for Application" for the "Topic" of "Stability." Likewise, the measurement of the effect of the second topic "resource usage" can be calculated to be −0.38, which can be presented on the web screen 300 as the "Effect of Topic on Aggregate Score for Application" for the "Topic" of "Resource Usage."

Returning to FIG. 7, at an operation 712, the measurement of the effect of the second topic can be included, by the first computer system, in the file to be transmitted to the second computer system to be used to control operations performed by the second computer system to produce the modification to the specific product. At an optional operation 714, the file can be transmitted from the first computer system to the second computer system. For example, with reference to FIG. 1 and for descriptive purposes herein, the measurement of the effect of the second topic can be included, by the digital distribution platform 102-2, in a file to be transmitted to the platform 102-5, which supports the application development system for Pig Parlor. The file can be transmitted from the digital distribution platform 102-2 via the network 106 to the platform 102-5.

Figure 8:
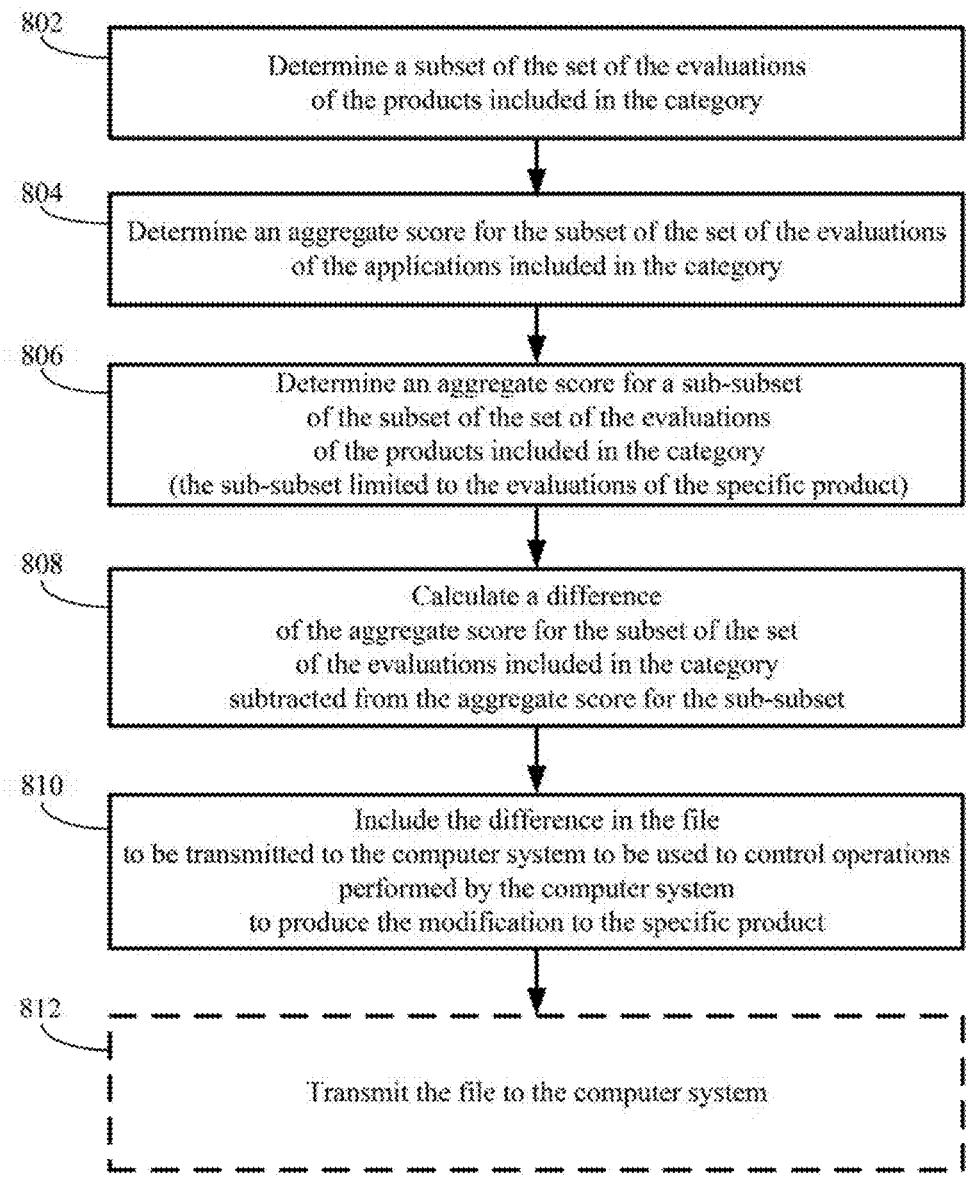
FIG. 8 is a flow diagram illustrating an example of a method for producing a measurement of an effect of the second topic on an aggregate of numerical information related to a subset, of the set of evaluations of the specific product, related to the second topic.

FIG. 8 is a flow diagram illustrating an example of a method 800 for producing a measurement of an effect of the second topic on an aggregate of numerical information related to a subset, of the set of evaluations of the specific product, related to the second topic. In the method 800, at an operation 802, a subset of the set of the evaluations of the products included in the category can be determined by the first computer system. The subset of the set of the evaluations of the products included in the category can be defined by inclusion of textual information about the second topic. The evaluations of the products (e.g., applications) included in the category can include scores. For example, with reference to FIG. 2 and for descriptive purposes herein, with the category determined to be applications for games for children and the second topic determined to be "stability," the subset of the set of evaluations of can be defined by inclusion of textual information about stability. For example, the field 210 of the record 218 includes information about stability ("very stable"), the field 210 of the record 220 includes information about stability ("free of bugs"), the field 210 of the record 222 includes information about stability ("did not see any problems with the operations"), the field 210 of the record 224 includes information about stability ("no hang ups"), the field 210 of the record 232 includes information about stability ("Sometimes hangs up"), the field 210 of the record 234 includes information about stability ("application stalled"), and the field 210 of the record 236 includes information about stability ("crashed hard").

Returning to FIG. 8, at an operation 804, an aggregate score for the subset of the set of the evaluations of the products included in the category can be determined by the first computer system. For example, with reference to FIG. 2 and for descriptive purposes herein, for the second topic "stability," the score 5 can be obtained from the field 212 of the record 218, the score 4 can be obtained from the field 212 of the record 220, the score 5 can be obtained from the field 212 of the record 222, the score 5 can be obtained from the field 212 of the record 224, the score 3 can be obtained from the field 212 of the record 232, the score 2 can be obtained from the field 212 of the record 234, and the score 1 can be obtained from the field 212 of the record 236. An average of the scores included in the subset of the set of the evaluations of products included in the category can be calculated: 3.57.

Returning to FIG. 8, at an operation 806, an aggregate score for a sub-subset of the subset of the set of the evaluations of products included in the category can be determined by the first computer system. The sub-subset can be limited to the evaluations of the specific product. For example, with reference to FIG. 2 and for descriptive purposes herein, for the second topic "stability," the score 2 can be obtained from the field 212 of the record 234 and the score 1 can be obtained from the field 212 of the record 236. An average of the scores included in the sub-subset can be calculated: 1.50.

Returning to FIG. 8, at an operation 808, a difference of the aggregate score for the subset of the set of the evaluations of the products included in the category subtracted from the aggregate score for the sub-subset can be calculated by the first computer system. For example, with reference to FIG. 2 and for descriptive purposes herein, for the second topic "stability," the aggregate score for the subset of the set of the evaluations of the products included in the category (3.57) can be subtracted from the aggregate score for the sub-subset (1.50) to yield the difference −2.07. FIG. 3 illustrates that the web screen 300 can present −2.07 as the "Comparison With Applications in Category" for the "Topic" of "Stability." In a similar manner, for the second topic "usability," the difference of the aggregate score for the subset of the set of the evaluations of the products included in the category subtracted from the aggregate score for the sub-subset can be calculated to be −0.79, which can be presented on the web screen 300 as the "Comparison With Applications in Category" for the "Topic" of "Usability." Likewise, for the second topic "resource usage," the difference of the aggregate score for the subset of the set of the evaluations of the products included in the category subtracted from the aggregate score for the sub-subset can be calculated to be −1.88, which can be presented on the web screen 300 as the "Comparison With Applications in Category" for the "Topic" of "Resource Usage."

Returning to FIG. 8, at an operation 810, the difference can be included, by the first computer system, in the file to be transmitted to the second computer system to be used to control operations performed by the second computer system to produce the modification to the specific product. At an optional operation 812, the file can be transmitted from the first computer system to the second computer system. For example, with reference to FIG. 1 and for descriptive purposes herein, the different can be included, by the digital distribution platform 102-2, in a file to be transmitted to the platform 102-5, which supports the application development system for Pig Parlor. The file can be transmitted from the digital distribution platform 102-2 via the network 106 to the platform 102-5.

Advantageously, transmission to the second computer system of: (1) the measurement of the effect of the first topic on the on the aggregate of the numerical information related to the set of evaluations of the specific product, (2) the measurement of the effect of the first topic on the on the aggregate of the numerical information related to the set of evaluations of the specific product, (3) the measurement of the effect of the second topic on the aggregate of the numerical information related to the subset, of the set of evaluations of the specific product, related to the second topic (i.e., the difference), or (4) any combination thereof can provide the second computer system with information to be used to control the operations performed by the second computer system to produce medication to the specific product. For example, this information can determine topics to be prioritized in the production of the modification. For example, with reference to FIG. 3 and for descriptive purposes herein, for both "Stability" and "Resource Usage," the "Effect of Topic on Aggregate Score for Application" is −0.30. However, under the "Comparison With Applications in Category," the difference for "Resource Usage" is −1.88 while the difference for "Stability" is −2.07. Accordingly, the second computer system (e.g., application development system) can prioritize production of a modification (e.g., update instruction) that addresses issues with the stability of Pig Parlor. Additionally, for example, the "Effect of Topic on Aggregate Score for Application" for "Level" is 0.00 can be compared with the "Aggregate Score for Application" of 2.25. Accordingly, the second computer system (e.g., application development system) can prioritize production of a modification (e.g., update instruction) that addresses issues with the levels of the game Pig Parlor.

Figure 9:
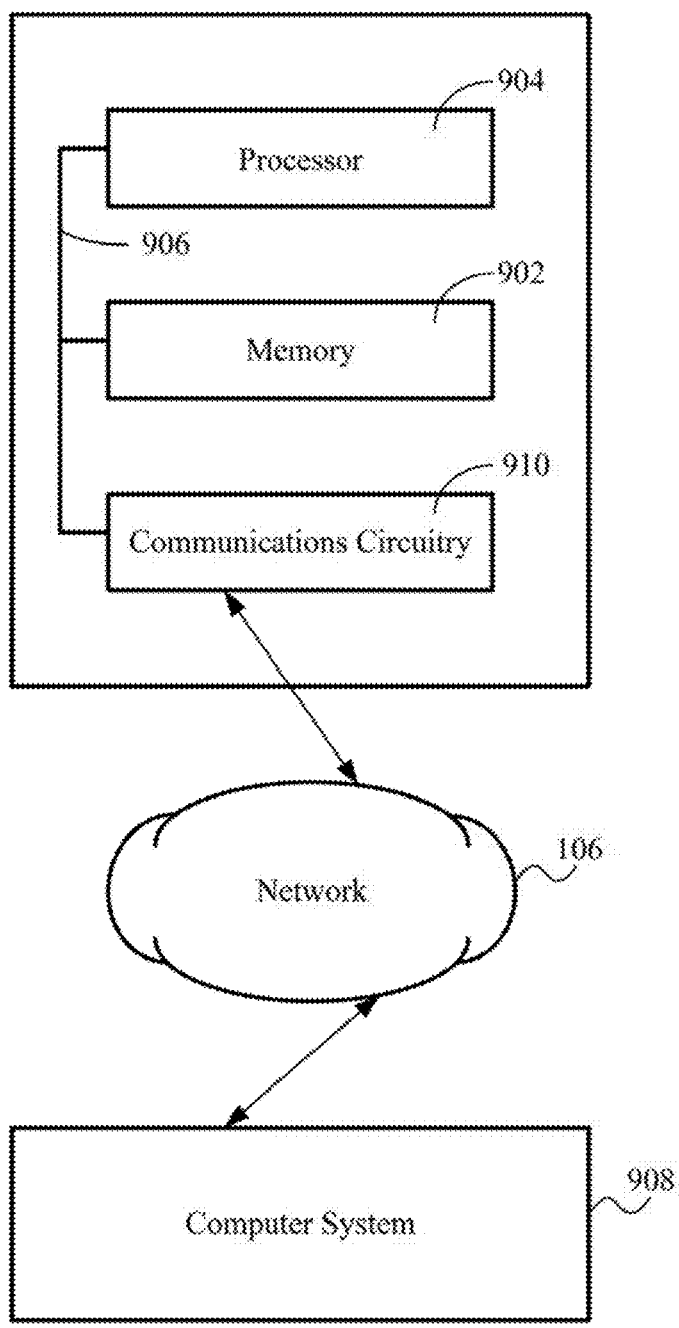
FIG. 9 is a block diagram illustrating an example of a system for producing a measurement of an effect of a first topic on an aggregate of numerical information related to a set of evaluations of a specific product.

FIG. 9 is a block diagram illustrating an example of a system 900 for producing a measurement of an effect of a first topic on an aggregate of numerical information related to a set of evaluations of a specific product. The specific product can be a good, a service, an application software product, the like, or any combination thereof. In an aspect, the system 900 can be a digital distribution platform such as platform 102-2, configured to support digital distribution operations. The system 900 can include, for example a memory 902, a processor 904, and a bus 906. The memory 902 can include one or more storage media. For example, the memory 902 can include at least one of a hard-drive, a solid state drive, optical drive, floppy disk, flash memory, read-only memory (ROM), random-access memory (RAM), cache memory, a Fibre Channel network, a storage area network (SAN), or any combination thereof. The processor 904 can include any processing circuit operative to control an operation of the system 900. The bus 906 can be coupled to the memory 902 and the processor 904, and can be configured to facilitate communications among these components. Other devices and components (not illustrated) can also be included in the system 900.

The memory 902 can be configured to store the set of the evaluations of the specific product as records in an electronic database. The memory 902 can be configured to store the measurement of the effect of the first topic on the aggregate of the numerical information related to the set of the evaluations. The numerical information can include one or more scores included in one or more of the evaluations of the specific product. Additionally or alternatively, the numerical information can include an amount of money expended, related to the specific product, from an account related to one or more of the evaluations of the specific product. For example, an entity associated with the second computer system may desire to prioritize topics of interest to those individuals who have spent relatively large amounts of money related to the specific product. Additionally or alternatively, the numerical information can include an amount of time expended accessing, from an account related to one or more of the evaluations of the specific product, a web site of a provider of the specific product. For example, the entity associated with the second computer system may desire to prioritize topics of interest to those individuals who have spent relatively large amounts of time accessing the web site of the entity. Additionally or alternatively, the numerical information can include a number of followers of a social media account related to one or more of the evaluations of the specific product. For example, the entity associated with the second computer system may desire to prioritize topics of interest to those individuals who have a relatively large number of followers of a social media account.

The processor 904 can be configured to determine a subset of the set of the evaluations of the specific product. The subset can be defined by inclusion of textual information about the first topic.

The processor 904 can be configured to determine an aggregate of the numerical information related to the subset. For example, the processor 904 can be configured to obtain, from the records for the subset, the numerical information included in the subset and to calculate an average of the numerical information included in the subset.

The processor 904 can be configured to calculate, based on the aggregate of the numerical information related to the subset, the measurement of the effect of the first topic on the aggregate of the numerical information related to the set of the evaluations. For example, the processor 904 can be configured to multiply a difference by a quotient. The difference can be the aggregate score for the set subtracted from the aggregate score for the subset. The quotient can be a count of a number of the evaluations included in the subset divided by a count of a number of the evaluations included in the set.

The processor 904 can be configured to include the measurement in a file to be transmitted to a computer system 908 to be used to control operations performed by the computer system 908 to produce a modification to the specific product. For example, the file can be a comma-separated values file. In an aspect, the computer system 908 can be an application development system supported by a platform such as the platform 102-5 illustrated in FIG. 1.

The system 900 can further include communications circuitry 910. The communications circuitry 910 can provide communications between the system 900 and devices external to the system 900. The communications circuitry 910 can be coupled to the bus 906. The communications circuitry 910 can be configured to provide communications via a packet switched network, a cellular network, a satellite network, an optical network, a telephone link, the like, or any combination thereof. The communications circuitry 910 can be configured to provide communications in a wired or a wireless manner. The communications circuitry 910 can be configured to perform simultaneously several communications operations using different networks. The communications circuitry 910 can be configured to transmit the file from the system 900 to the computer system 908 via the network 106.

Optionally, the system 900 can be configured to determine the first topic. For example, the first topic can be determined using a term frequency-inverse document frequency (tf-idf) technique. Additionally or alternatively, the first topic can be determined using an automatic document classification technique. The automatic document classification technique can be an unsupervised automatic document classification technique, a supervised automatic document classification technique, or both.

For example, the system 900 can be configured to identify a pattern included in textual information of the evaluations included in the set of the evaluations. The pattern can be a pattern in parts of speech. The pattern can include a noun and an adjective. For example, the pattern can include a first pattern, a second pattern, or both. The first pattern can have an adjective followed by a noun. The second pattern can have a noun followed by a verb followed by an adjective. In an aspect, the pattern can include a plurality of patterns. Each of the plurality of patterns can include a corresponding noun and a corresponding adjective.

For example, the system 900 can be configured to calculate a count of a number of occurrences of the noun in the pattern in the set of the evaluations. In the aspect in which the pattern includes a plurality of patterns such that each of the plurality of patterns includes a corresponding noun and a corresponding adjective, the system 900 can calculate a count of a number of occurrences for each corresponding noun.

For example, the system 900 can assign a numerical value to the adjective in the pattern. The numerical value can be related to a strength of an opinion associated with the adjective. In the aspect in which the pattern includes a plurality of patterns such that each of the plurality of patterns includes a corresponding noun and a corresponding adjective, the system 900 can assign a numerical value for each corresponding adjective.

In the aspect in which the pattern includes a plurality of patterns such that each of the plurality of patterns includes a corresponding noun and a corresponding adjective, the system 900 can be configured to produce a cluster of nouns. The cluster can be defined by a same subject described by the nouns.

Optionally, the system 900 can be configured to calculate a product. The product can be the count of the numerical occurrences of the noun in the pattern multiplied by a first weight multiplied by the numerical value assigned to the adjective in the pattern multiplied by a second weight. The system 900 can be configured to determine whether an absolute value of the product is greater than a threshold. Additionally, in the aspect in which a cluster of nouns, defined by a same subject described by the nouns, is produced, the system 900 can calculate a product for the cluster of nouns as a product of the products of the patterns associated with the nouns.

For example, the system 900 can be configured to select the first topic. The first topic can be selected based on the number of occurrences of the noun in the pattern and based on the numerical value assigned to the adjective in the pattern. If the system 900: (1) calculated the product of the count of the numerical occurrences of the noun in the pattern multiplied by the first weight multiplied by the numerical value assigned to the adjective in the pattern multiplied by the second weight and (2) determined whether the absolute value of the product is greater than the threshold, then the system 900 can be configured to select the first topic by identifying the noun in the pattern as the first topic in response to the absolute value of the product of the pattern being greater than the threshold. Additionally, if the system 900 produced the cluster of nouns, then the system 900 can be configured to select the first topic based on the cluster of the nouns.

In an aspect, the specific product can be included in a category of products.

In this aspect, the system 900 can be configured to produce a measurement of an effect of a second topic on the aggregate of the numerical information related to the set of evaluations of the specific product.

In this aspect, optionally, the system 900 can be configured to determine the products included in the category. For example, the system 900 can determine the category for the specific product in response to the specific product (e.g., application) having been uploaded, by the computer system 908 (e.g., application development system) and via the network 106, to the system 900 (e.g., digital distribution platform). Additionally or alternatively, the system 900 can be configured to receive, from the computer system 908, a signal. The signal can have information that identifies the products included in the category. For example, the computer system 908 (e.g., application development system) can transmit the signal in conjunction with uploading the specific product (e.g., application) to the system 900 (e.g., digital distribution platform). Additionally or alternatively, the computer system 908 can transmit the signal at a different time.

In this aspect, optionally, the system 900 can be configured to determine the second topic. The second topic can be predefined. For example, the second topic can be related to an issue with the products included in the category.

In this aspect, optionally, the system 900 can be configured to determine words related to the second topic. The words related to the second topic can be predetermined. For example, the words related to the second topic can be determined using an automatic document classification technique. The automatic document classification technique can be an unsupervised automatic document classification technique, a supervised automatic document classification technique, or both. The automatic document classification technique can include use of a classifier. The classifier can be a linear classifier, a hierarchical classifier, or both. For each second topic, the words related to the second topic can be determined by a corresponding classifier. The automatic document classification technique can be applied to the textual information of the evaluations of the products included in the category.

In this aspect, the system 900 can be configured to produce the measurement of the effect of the second topic on the aggregate of the numerical information related to the set of the evaluations of the specific product. For example, as described above, a subset of the set of the evaluations of the specific product can be determined by the system 900. The subset can be defined by inclusion of textual information about the second topic. An aggregate of the numerical information related to the subset can be determined by the system 900. The measurement of the effect of the second topic on the aggregate of the numerical information related to the set of the evaluations of the specific product can be calculated by the system 900. The measurement of the effect of the second topic can be included, by the system 900, in the file to be transmitted to the computer system 908 to be used to control operations performed by the computer system 908 to produce the modification to the specific product. The communications circuitry 910 can be configured to transmit the file from the system 900 to the computer system 908 via the network 106.

Additionally or alternatively, in this aspect, the system 900 can be configured to produce a measurement of an effect of the second topic on an aggregate of numerical information related to a subset, of the set of evaluations of the specific product, related to the second topic. For example, the system 900 can be configured to determine a subset of the set of the evaluations of the products included in the category. The subset of the set of the evaluations of the products included in the category can be defined by inclusion of textual information about the second topic. The system 900 can be configured to determine an aggregate of the numerical information related to the subset of the set of the evaluations of the products included in the category. The system 900 can be configured to determine an aggregate of numerical information related to a sub-subset of the subset of the set of the evaluations of the products included in the category. The sub-subset can be limited to the evaluations of the specific product. The system 900 can be configured to calculate a difference of the aggregate of the numerical information related to the subset of the set of the evaluations of the products included in the category subtracted from the aggregate of the numerical information related to the sub-subset. The measurement of the difference can be included, by the system 900, in the file to be transmitted to the computer system 908 to be used to control operations performed by the computer system 908 to produce the modification to the specific product. The communications circuitry 910 can be configured to transmit the file from the system 900 to the computer system 908 via the network 106.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a system as disclosed herein.

Figure 10:
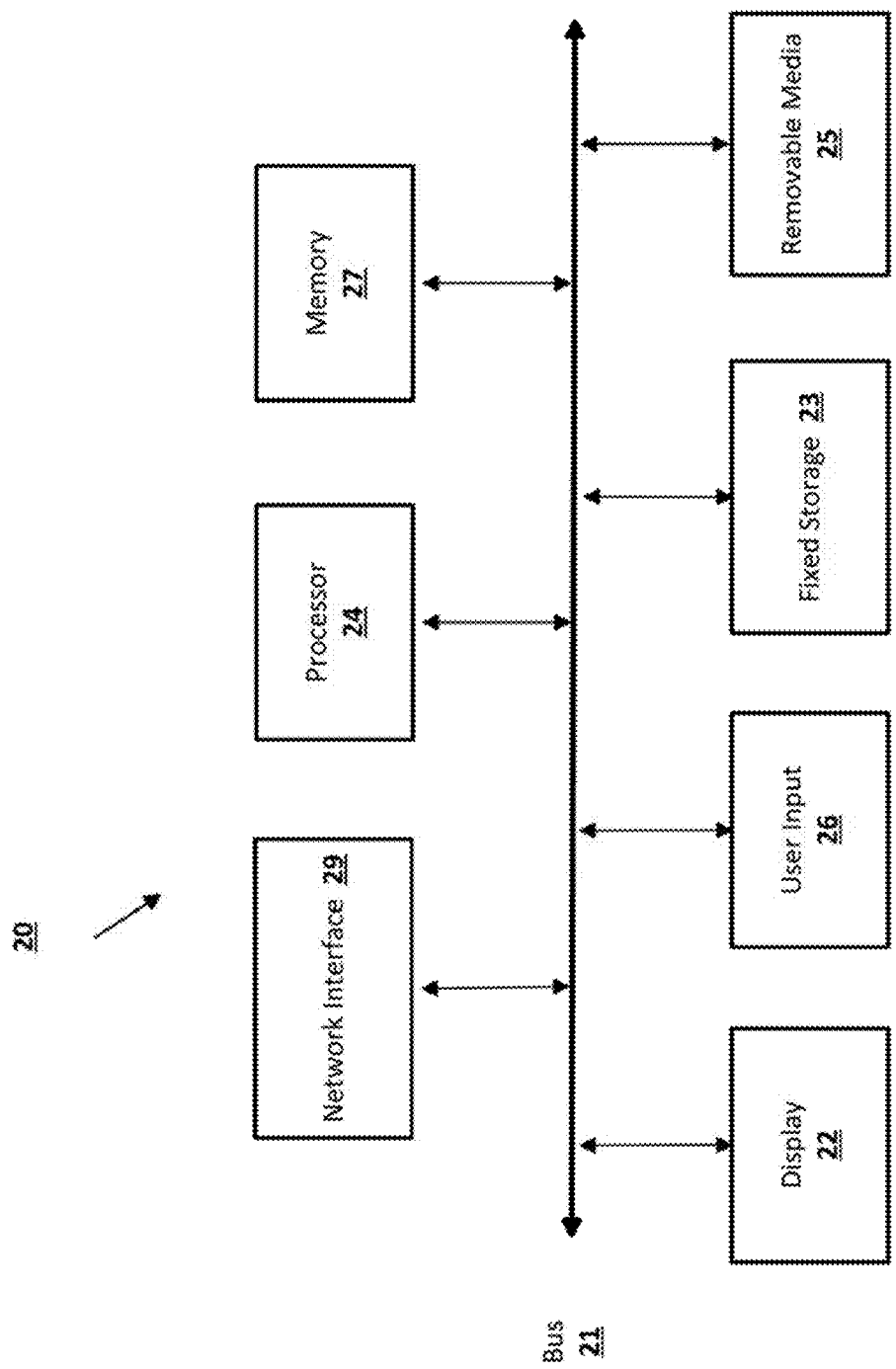
FIG. 10 illustrates an example computing device suitable for implementing aspects of the disclosed subject matter.
Figure 11:
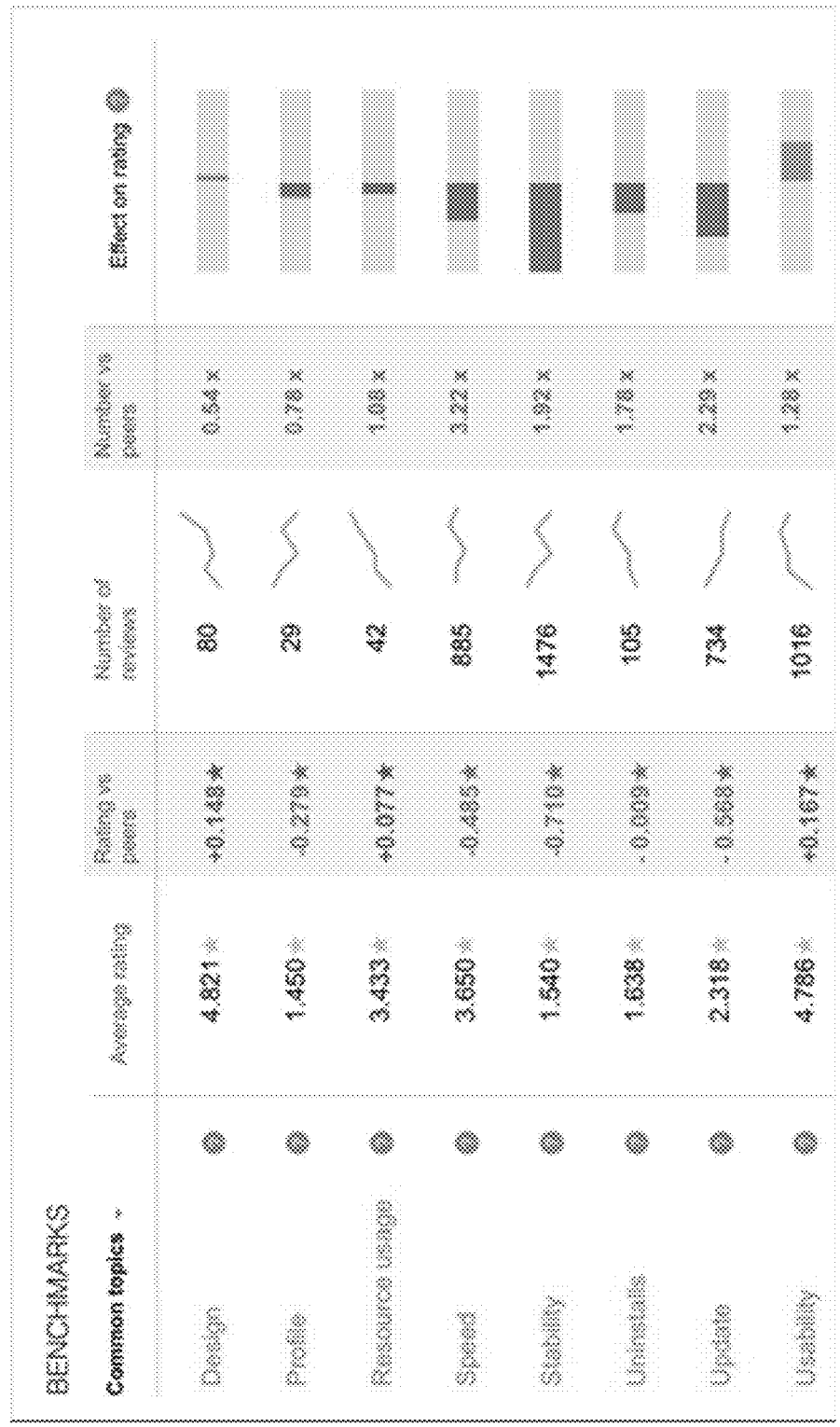
FIGS. 11 through 19 illustrate examples of web screens associated with an interface, of a digital distribution platform and accessible by an application development system, to present information from evaluations of a specific application.
Figure 12:
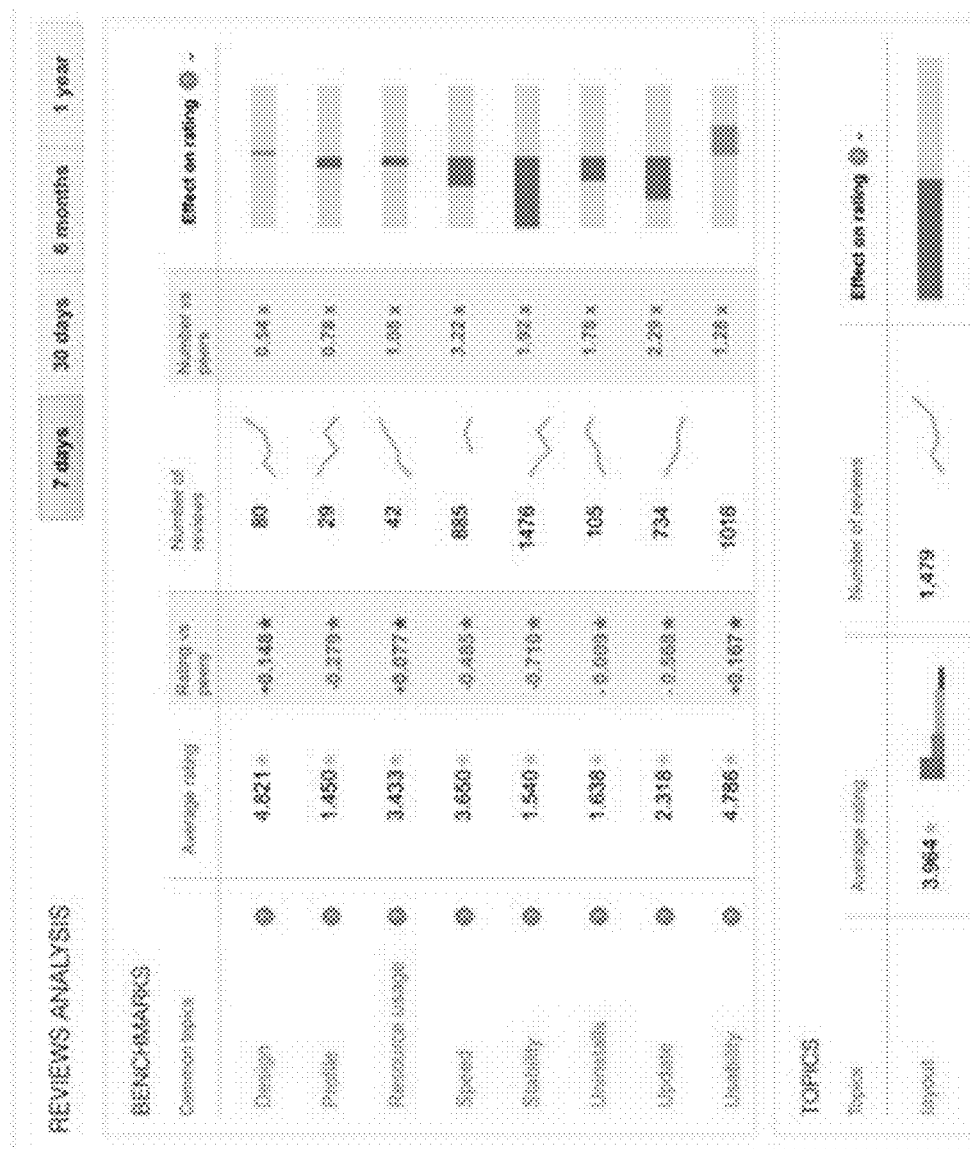
Figure 13:
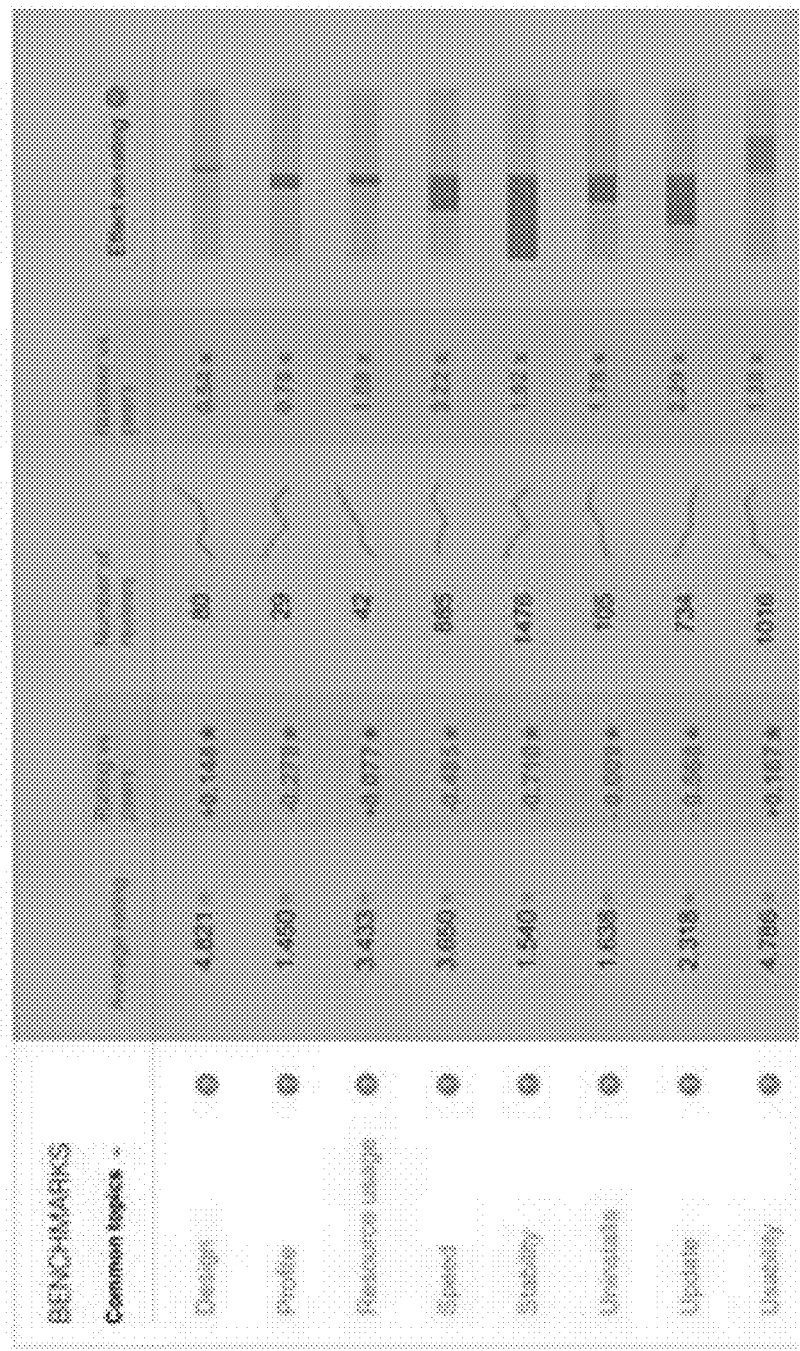
Figure 14:
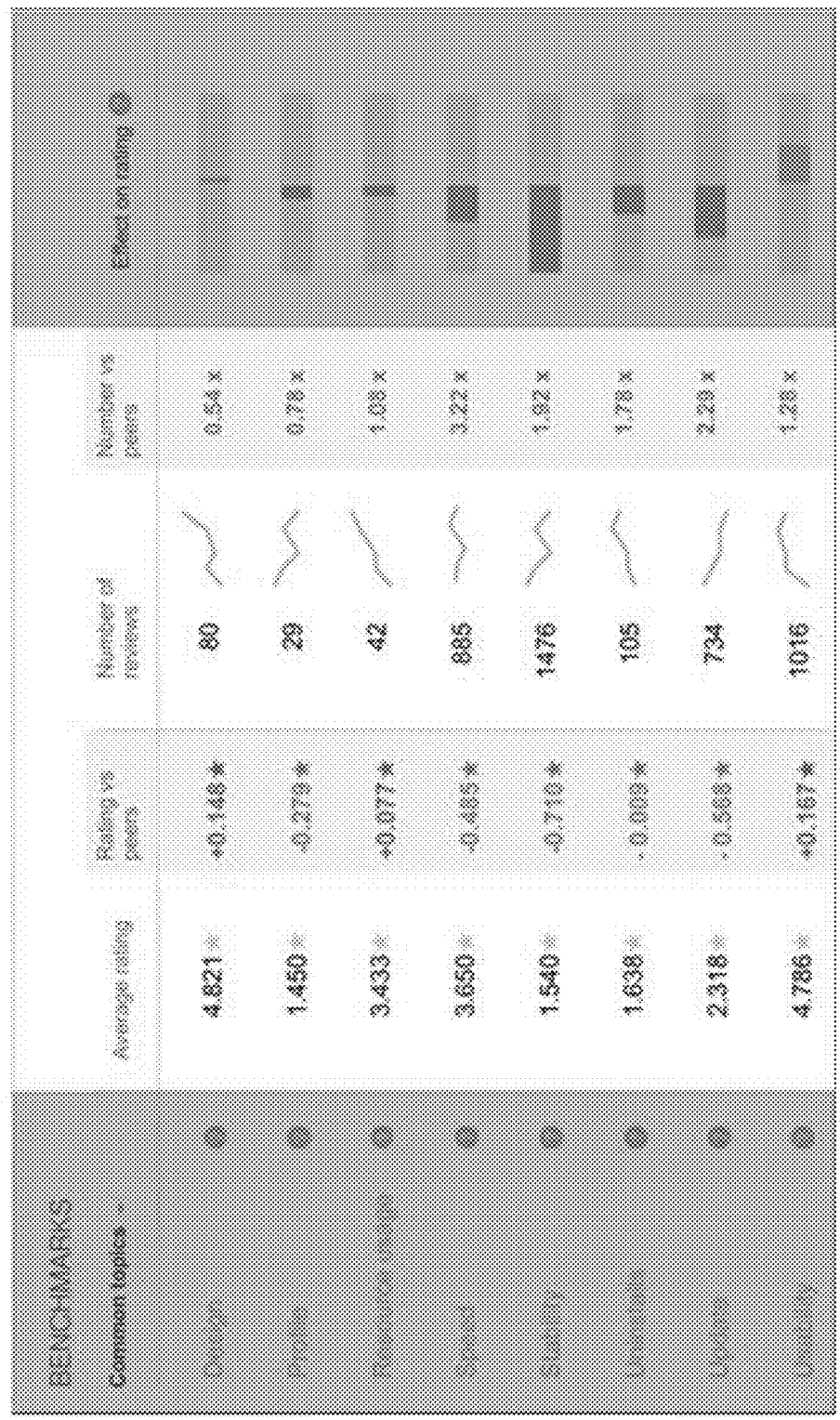
Figure 15:
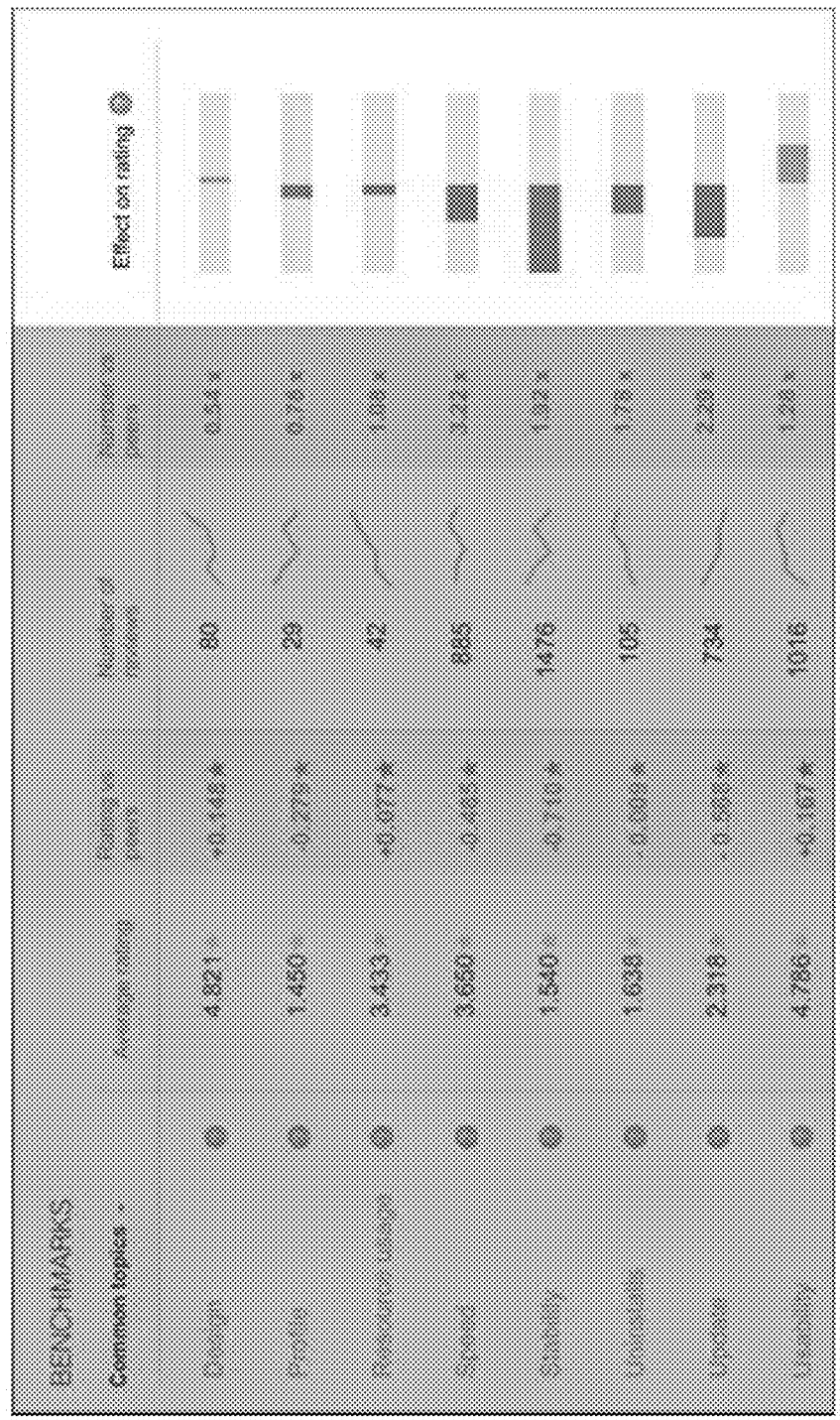
Figure 16:
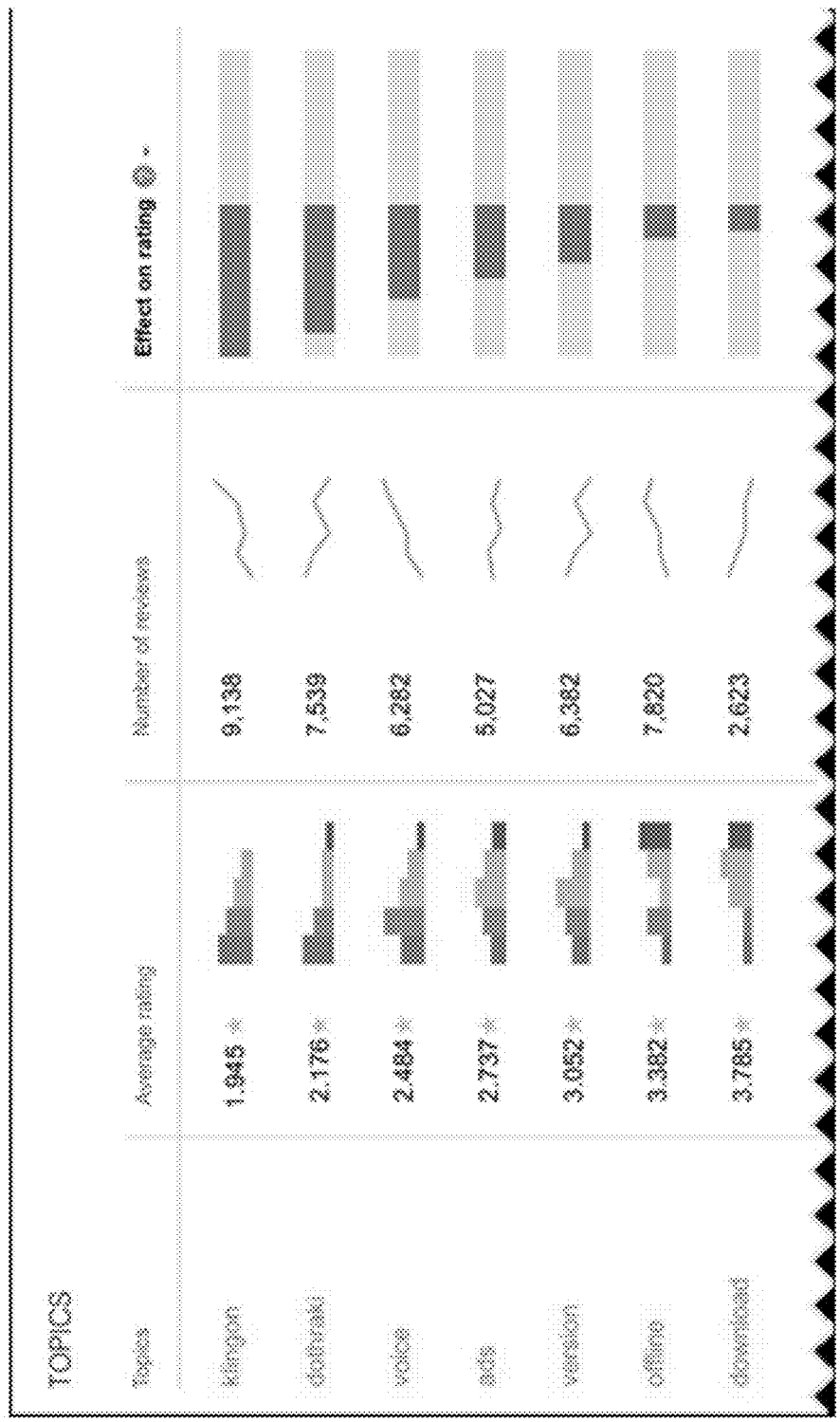
Figure 17:
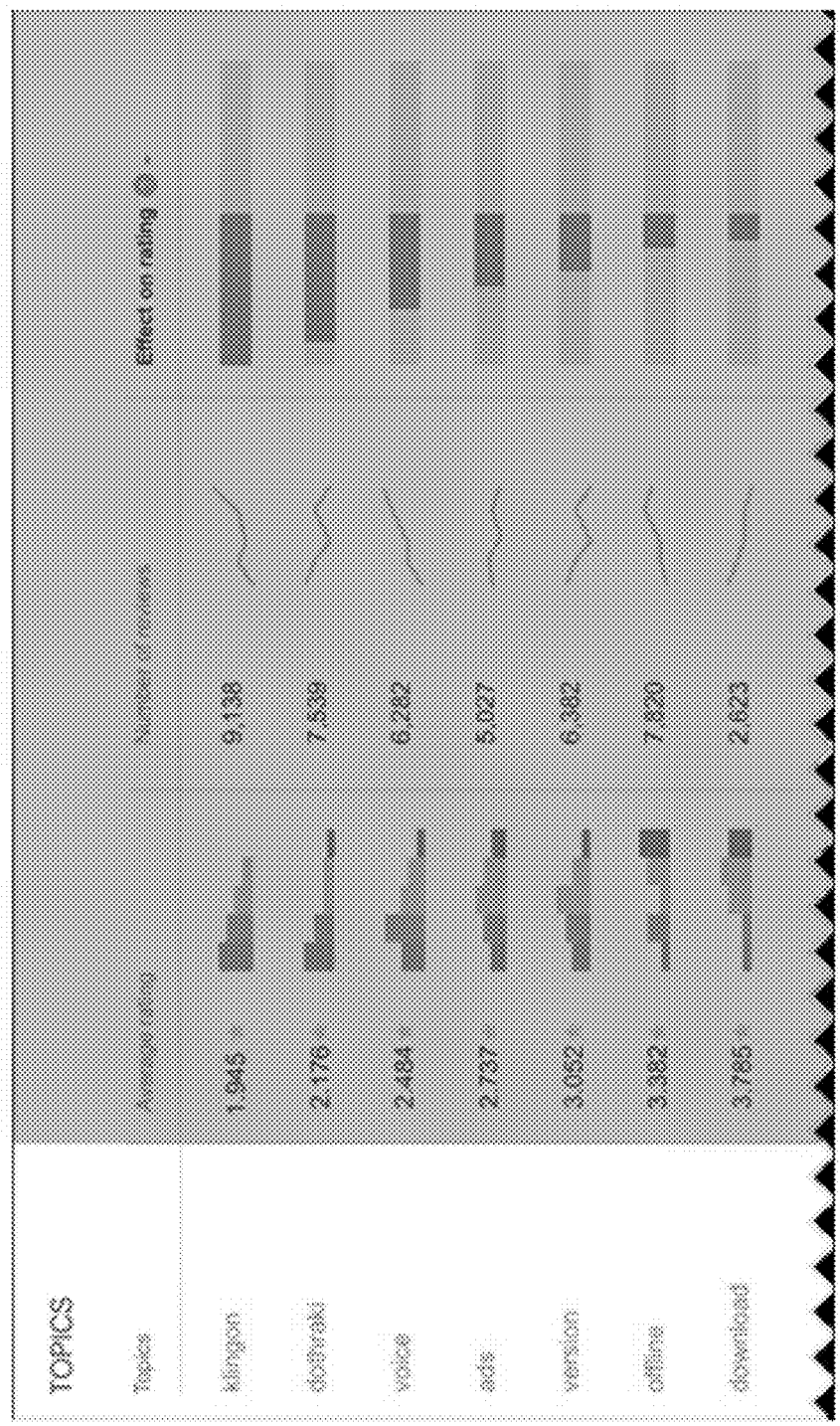
Figure 18:
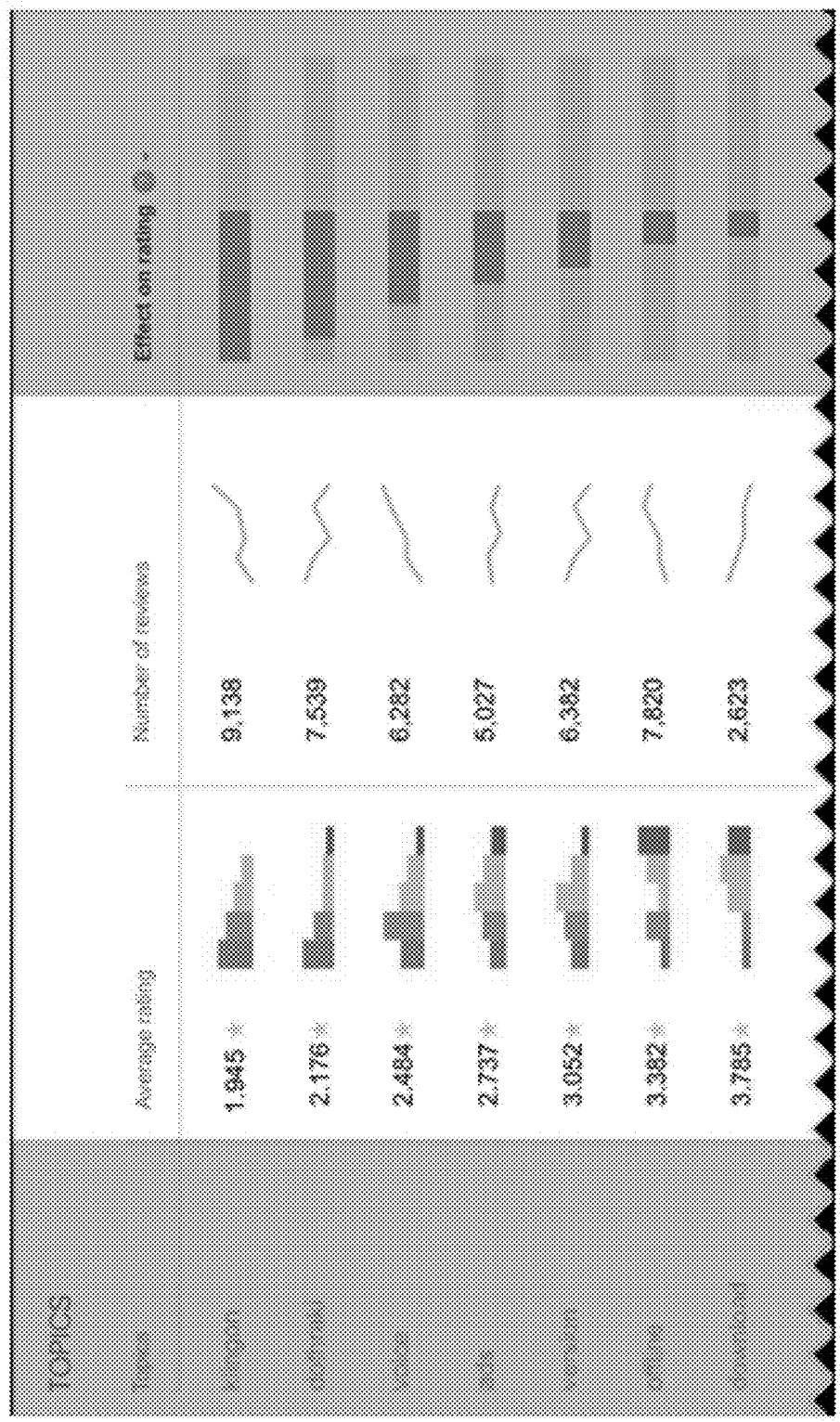
Figure 19:
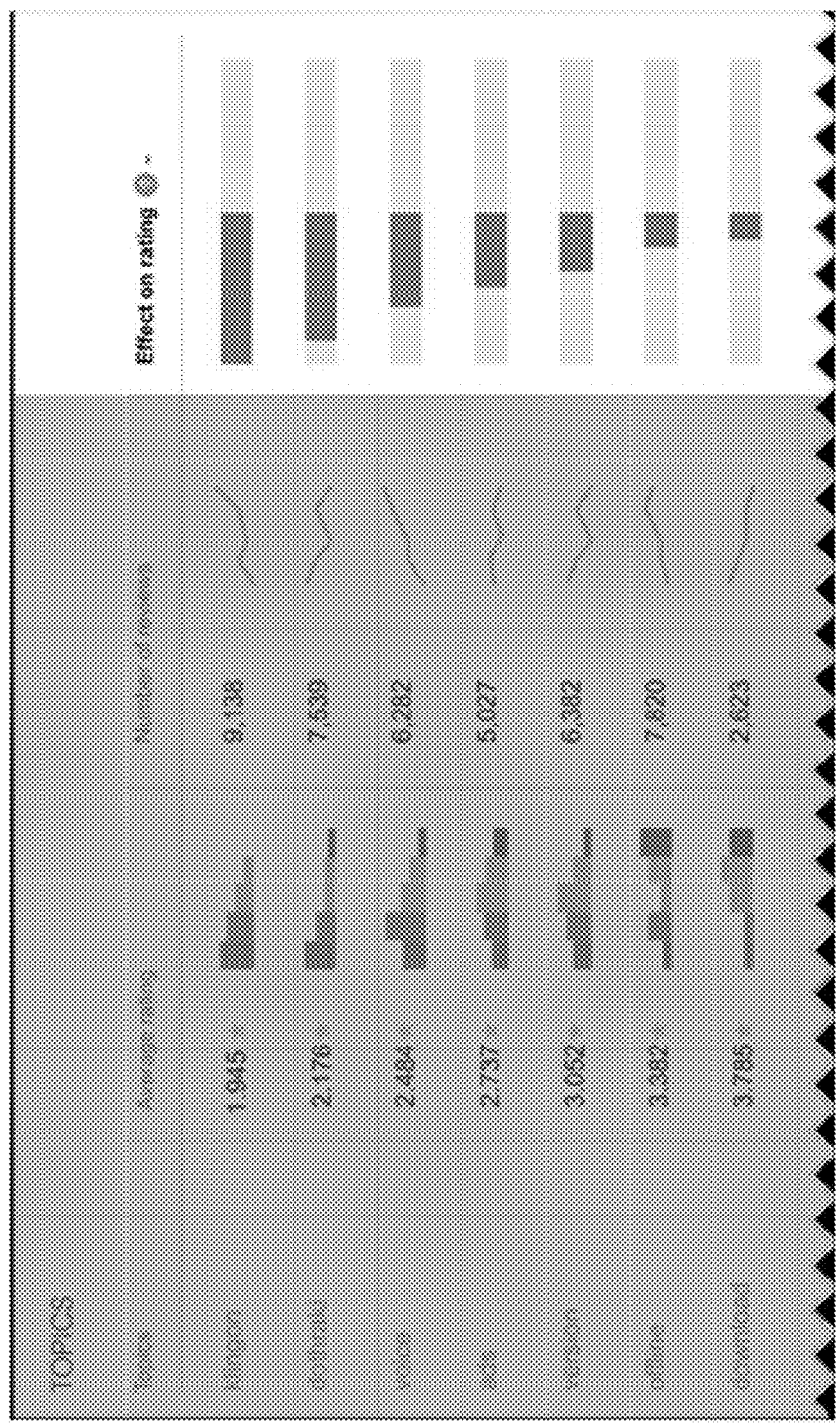

Aspects of the presently disclosed subject matter may be implemented in and used with a variety of component and network architectures. FIG. 10 illustrates an example computing device 20 suitable for implementing aspects of the disclosed subject matter. The device 20 can be, for example, a desktop or laptop computer, or a mobile computing device such as a smart phone, tablet, or the like. The device 20 can include a bus 21 (which can interconnect major components of the computer 20, such as a central processor 24), a memory 27 (such as random-access memory (RAM), read-only memory (ROM), flash RAM, or the like), a user display 22 (such as a display screen), a user input interface 26 (which can include one or more controllers and associated user input devices such as a keyboard, mouse, touch screen, and the like), a fixed storage 23 (such as a hard drive, flash storage, and the like), a removable media component 25 (operative to control and receive an optical disk, flash drive, and the like), and a network interface 29 operable to communicate with one or more remote devices via a suitable network connection.

The bus 21 can allow data communication between the central processor 24 and one or more memory components, which can include RAM, ROM, and other memory, as previously noted. Typically RAM can be the main memory into which an operating system and application programs are loaded. A ROM or flash memory component can contain, among other code, the basic input-output system (BIOS) which can control basic hardware operation such as the interaction with peripheral components. Applications resident with the computer 20 can generally be stored on and accessed via a computer readable medium, such as a hard disk drive (e.g., fixed storage 23), an optical drive, floppy disk, or other storage medium.

The fixed storage 23 can be integral with the computer 20 or can be separate and accessed through other interfaces. The network interface 29 can provide a direct connection to a remote server via a wired or wireless connection. The network interface 29 can provide such connection using any suitable technique and protocol as is readily understood by one of skill in the art, including digital cellular telephone, WiFi™, Bluetooth®, near-field, and the like. For example, the network interface 29 can allow the computer to communicate with other computers via one or more local, wide-area, or other communication networks, as described in further detail below.

Many other devices or components (not shown) can be connected in a similar manner (e.g., document scanners, digital cameras and so on). Conversely, all of the components illustrated in FIG. 10 need not be present to practice the disclosed subject matter. The components can be interconnected in different ways from that illustrated. The operation of a computer such as that illustrated in FIG. 10 is readily known in the art and is not discussed in detail in this application. Code to implement the disclosed subject matter can be stored in computer-readable storage media such as one or more of the memory 27, fixed storage 23, removable media 25, or on a remote storage location.

More generally, various aspects of the presently disclosed subject matter can include or be realized in the form of computer-implemented processes and apparatuses for practicing those processes. Aspects also can be realized in the form of a computer program product having computer program code containing instructions embodied in non-transitory and/or tangible media, such as floppy diskettes, CD-ROMs, hard drives, universal serial bus (USB) drives, or any other machine readable storage medium, such that when the computer program code is loaded into and executed by a computer, the computer becomes an apparatus for practicing aspects of the disclosed subject matter. Aspects also can be realized in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing aspects of the disclosed subject matter. When implemented on a general-purpose microprocessor, the computer program code segments configure the microprocessor to create specific logic circuits.

In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Aspects can be implemented using hardware that can include a processor, such as a general purpose microprocessor and/or an application-specific integrated circuit (ASIC) that embodies all or part of the techniques according to aspects of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to aspects of the disclosed subject matter.

FIGS. 11 through 19 illustrate examples of web screens associated with an interface, of a digital distribution platform and accessible by an application development system, to present information from evaluations of a specific application.

The foregoing description, for purpose of explanation, has been described with reference to specific aspects. However, the illustrative discussions above are not intended to be exhaustive or to limit aspects of the disclosed subject matter to the precise forms disclosed. Many modifications and variations are possible in view of the above teachings. The aspects were chosen and described in order to explain the principles of aspects of the disclosed subject matter and their practical applications, to thereby enable others skilled in the art to utilize those aspects as well as various aspects with various modifications as may be suited to the particular use contemplated.

The invention claimed is:

1. A method for producing a measurement of an effect of a first topic on an aggregate of numerical information related to a set of evaluations of a specific product, comprising:
   determining, by a first computer system, a subset of the set of the evaluations, the subset defined by inclusion of textual information about the first topic, the set being stored in records in an electronic database, the specific product being at least one of a good, a service, or an application software product;
   determining, by the first computer system, an aggregate of the numerical information related to the subset;
   calculating, by the first computer system and based on the aggregate of the numerical information related to the subset, the measurement of the effect of the first topic on the aggregate of the numerical information related to the set; and
   including, by the first computer system, the measurement in a file to be transmitted to a second computer system to be used to control operations performed by the second computer system to produce a modification to the specific product;
   identifying a pattern included in the textual information of the evaluations included in the set of the evaluations, the pattern being a pattern in parts of speech, the pattern including a noun and an adjective;
   calculating a count of a number of occurrences of the noun in the pattern in the set of the evaluations;
   assigning a numerical value to the adjective in the pattern, the numerical value related to a strength of an opinion associated with the adjective;
   calculating a product of the count of the numerical occurrences of the noun in the pattern multiplied by a first weight multiplied by the numerical value assigned to the adjective in the pattern multiplied by a second weight;
   determining whether an absolute value of the product is greater than a threshold; and
   responsive to determining that the absolute value of the product is greater than the threshold, identifying the noun in the pattern as the first topic.

2. The method of claim 1, wherein the numerical information comprises at least one of:
   at least one score included in at least one of the evaluations of the specific product,
   an amount of money expended, related to the specific product, from a first account related to the at least one of the evaluations of the specific product,
   an amount of time expended accessing, from a second account related to the at least one of the evaluations of the specific product, a web site of a provider of the specific product, or
   a number of followers of a social media account related to the at least one of the evaluations of the specific product.

3. The method of claim 1, wherein:
   the first computer system comprises a digital distribution platform;
   the specific product comprises the application software product;

the second computer system comprises an application development system; and the modification comprises an upgrade instruction.

4. The method of claim 1, further comprising transmitting, from the first computer system to the second computer system, the file.

5. The method of claim 1, wherein the calculating the measurement of the effect of the first topic comprises multiplying a difference by a quotient, the difference being the aggregate of the numerical information related to the set subtracted from the aggregate of the numerical information related to the subset, the quotient being a count of a number of the evaluations included in the subset divided by a count of a number of the evaluations included in the set.

6. The method of claim 1, wherein the determining the aggregate of the numerical information related to the subset comprises:

obtaining, from the records for the subset, the numerical information related to the subset; and calculating an average of the numerical information related to the subset.

7. The method of claim 1, wherein the pattern includes at least one of a first pattern or a second pattern, the first pattern having the adjective followed by the noun, the second pattern having the noun followed by a verb followed by the adjective.

8. The method of claim 1, wherein the specific product is included in a category of products.

9. The method of claim 8, further comprising determining, by the first computer system, the products included in the category.

10. The method of claim 8, further comprising receiving, by the first computer system and from the second computer system, a signal, the signal having information that identifies the products included in the category.

11. The method of claim 8, further comprising:

producing, by the first computer system, a measurement of an effect of a second topic on the aggregate of the numerical information related to the set of the evaluations; and including, by the first computer system, the measurement of the effect of the second topic in the file to be transmitted to the second computer system to be used to control the operations performed by the second computer system to produce the modification to the specific product.

12. The method of claim 11, wherein the second topic is predefined.

13. The method of claim 11, further comprising determining, by the first computer system, words related to the second topic using at least one of an unsupervised automatic document classification technique or a supervised automatic document classification technique.

14. The method of claim 11, wherein the category is associated with a set of evaluations of the products included in the category, and further comprising:

determining, by the first computer system, a subset of the set of the evaluations of the products included in the category, the subset of the set of the evaluations of the products included in the category defined by inclusion of textual information about the second topic;

determining, by the first computer system, an aggregate of the numerical information related to the subset of the set of the evaluations of the products included in the category;

determining, by the first computer system, an aggregate of the numerical information related to a sub-subset of the subset of the set of the evaluations of the products included in the category, the sub-subset limited to the evaluations of the specific product;

calculating, by the first computer system, a difference of the aggregate of the numerical information related to the subset of the set of the evaluations of the products included in the category subtracted from the aggregate of the numerical information related to the sub-subset; and including, by the first computer system, the difference in the file to be transmitted to the second computer system to be used to control the operations performed by the second computer system to produce the modification to the specific product.

15. A non-transitory computer-readable medium storing computer code for controlling a processor to cause the processor to produce a measurement of an effect of a topic on an aggregate of numerical information related to a set of evaluations of a specific product, the computer code including instructions to cause the processor to:

determine a subset of the set of the evaluations, the subset defined by inclusion of textual information about the topic, the set being stored in records in an electronic database, the specific product being at least one of a good, a service, or an application software product;

determine an aggregate of the numerical information related to the subset;

calculate, based on the aggregate of the numerical information related to the subset, the measurement of the effect of the topic on the aggregate of the numerical information related to the set;

include the measurement in a file to be transmitted to a computer system to be used to control operations performed by the computer system to produce a modification to the specific product;

identify a pattern included in the textual information of the evaluations included in the set of the evaluations, the pattern being a pattern in parts of speech, the pattern including a noun and an adjective;

calculate a count of a number of occurrences of the noun in the pattern in the set of the evaluations;

assign a numerical value to the adjective in the pattern, the numerical value related to a strength of an opinion associated with the adjective;

calculate a product of the count of the numerical occurrences of the noun in the pattern multiplied by a first weight multiplied by the numerical value assigned to the adjective in the pattern multiplied by a second weight;

determine whether an absolute value of the product is greater than a threshold; and responsive to determining that the absolute value of the product is greater than the threshold, identify the noun in the pattern as the first topic.

16. A system for producing a measurement of an effect of a topic on an aggregate of numerical information related to a set of evaluations of a specific product, comprising:

a memory configured to store:

the set of the evaluations of the specific product as records in an electronic database, the specific product being at least one of a good, a service, or an application software product; and the measurement of the effect of the topic on the aggregate of the numerical information related to the set of the evaluations; and a processor configured to:
- determine a subset of the set of the evaluations, the subset defined by inclusion of textual information about the topic;
- determine an aggregate of the numerical information related to the subset;
- calculate, based on the aggregate of the numerical information related to the subset, the measurement of the effect of the topic on the aggregate of the numerical information related to the set;
- include the measurement in a file to be transmitted to a computer system to be used to control operations performed by the computer system to produce a modification to the specific product;
- identify a pattern included in the textual information of the evaluations included in the set of the evaluations, the pattern being a pattern in parts of speech, the pattern including a noun and an adjective;
- calculate a count of a number of occurrences of the noun in the pattern in the set of the evaluations;
- assign a numerical value to the adjective in the pattern, the numerical value related to a strength of an opinion associated with the adjective;
- calculate a product of the count of the numerical occurrences of the noun in the pattern multiplied by a first weight multiplied by the numerical value assigned to the adjective in the pattern multiplied by a second weight;
- determine whether an absolute value of the product is greater than a threshold; and
- responsive to determining that the absolute value of the product is greater than the threshold, identify the noun in the pattern as the first topic.

* * * * *